(12) United States Patent
Periyannan et al.

(10) Patent No.: US 9,041,765 B2
(45) Date of Patent: *May 26, 2015

(54) SYSTEMS AND METHODS FOR SECURITY AND PRIVACY CONTROLS FOR VIDEOCONFERENCING

(75) Inventors: Alagu Periyannan, Palo Alto, CA (US); Krish Ramakrishnan, Saratoga, CA (US); Raghavan Anand, Santa Clara, CA (US); Anand Raghavan, San Francisco, CA (US); Ravi Kiran Kalluri, San Jose, CA (US); Emmanuel Weber, San Jose, CA (US)

(73) Assignee: Blue Jeans Network, Mountain View, CA (US)

( * ) Notice: Subject to any disclaimer, the term of this patent is extended or adjusted under 35 U.S.C. 154(b) by 810 days.

This patent is subject to a terminal disclaimer.

(21) Appl. No.: 13/105,704

(22) Filed: May 11, 2011

(65) Prior Publication Data

US 2011/0279637 A1     Nov. 17, 2011

Related U.S. Application Data

(60) Provisional application No. 61/334,043, filed on May 12, 2010, provisional application No. 61/334,045, filed on May 12, 2010, provisional application No. 61/334,050, filed on May 12, 2010, provisional application No. 61/334,054, filed on May 12, 2010.

(51) Int. Cl.
*H04N 7/15* (2006.01)
*H04N 7/14* (2006.01)
*H04N 5/265* (2006.01)

(52) U.S. Cl.
CPC ............... *H04N 7/152* (2013.01); *H04N 7/141* (2013.01); *H04N 5/265* (2013.01)

(58) Field of Classification Search
CPC ......... H04N 7/141; H04N 7/152; H04N 7/15; H04N 5/265

USPC .......... 348/14.01, 14.02, 14.03, 14.09, 14.08, 348/585; 370/260, 262; 455/404.1; 705/7.19; 709/204; 713/193, 161; 715/753; 726/6

See application file for complete search history.

(56) References Cited

U.S. PATENT DOCUMENTS 4,455,455 A * 6/1984 Little ....................... 379/203.01
5,530,472 A * 6/1996 Bregman et al. ........... 348/14.09
(Continued)

FOREIGN PATENT DOCUMENTS

DE     10358846 A1    7/2005
EP     0955765 A1    11/1999
(Continued)

*Primary Examiner* — Gerald Gauthier
(74) *Attorney, Agent, or Firm* — Ascenda Law Group, PC

(57) ABSTRACT

A new approach is proposed that contemplates systems and methods to support the operation of a Virtual Media Room or Virtual Meeting Room (VMR), wherein each VMR can accept from a plurality of participants at different geographic locations a variety of video conferencing feeds of audio and video streams from video conference endpoints and enables a multi-party video conferencing session in real time among the plurality of participants. Each of the participants is offered a rich set of conferencing and collaboration interaction hitherto not experienced by video conferencing participants and a moderator of the video conference is further offered with in-meeting management and control over a plurality of security and privacy settings during the video conference. These interactions encompass controlling of a video conferencing session, its configuration, privacy, security, the visual layout of the participants, customization of the VMR and adaptation of the room to different vertical applications.

24 Claims, 21 Drawing Sheets

(56) References Cited

U.S. PATENT DOCUMENTS

| | | | |
|---|---|---|---|
| 5,657,096 A * | 8/1997 | Lukacs | 348/585 |
| 5,867,579 A * | 2/1999 | Saito | 705/57 |
| 5,959,662 A * | 9/1999 | Shaffer et al. | 348/14.08 |
| 6,069,952 A * | 5/2000 | Saito et al. | 705/57 |
| 6,075,571 A | 6/2000 | Kuthyar et al. | |
| 6,330,022 B1 * | 12/2001 | Seligmann | 348/14.08 |
| 6,449,717 B1 * | 9/2002 | Saito | 713/161 |
| 6,831,676 B2 * | 12/2004 | Monroe | 348/14.08 |
| 7,477,282 B2 | 1/2009 | Firestone et al. | |
| 7,577,420 B2 * | 8/2009 | Srinivasan et al. | 455/404.1 |
| 7,830,824 B2 * | 11/2010 | Decker et al. | 370/262 |
| 8,214,242 B2 * | 7/2012 | Agapi et al. | 705/7.19 |
| 8,289,365 B2 * | 10/2012 | De Lind Van Wijngaarden et al. | 348/14.08 |
| 8,316,104 B2 | 11/2012 | Galvez et al. | |
| 8,405,701 B2 * | 3/2013 | de Lind van Wijngaarden et al. | 348/14.02 |
| 8,482,593 B2 * | 7/2013 | Periyannan et al. | 348/14.08 |
| 8,483,098 B2 * | 7/2013 | Vadlakonda et al. | 370/260 |
| 8,484,705 B2 * | 7/2013 | Hoppe et al. | 726/6 |
| 8,514,263 B2 * | 8/2013 | Periyannan et al. | 348/14.08 |
| 2002/0126201 A1 | 9/2002 | Schmitt et al. | |
| 2002/0159394 A1 | 10/2002 | Decker et al. | |
| 2007/0064901 A1 | 3/2007 | Baird et al. | |
| 2007/0127668 A1 | 6/2007 | Ahya et al. | |
| 2007/0156813 A1 | 7/2007 | Galvez et al. | |
| 2007/0165106 A1 | 7/2007 | Groves et al. | |
| 2008/0068449 A1 | 3/2008 | Wu et al. | |
| 2008/0120675 A1 | 5/2008 | Morad et al. | |
| 2008/0313278 A1 * | 12/2008 | Hochberg | 709/204 |
| 2009/0210789 A1 | 8/2009 | Thakkar et al. | |
| 2010/0005497 A1 | 1/2010 | Maresca | |
| 2010/0008419 A1 | 1/2010 | Wu | |
| 2011/0279634 A1 * | 11/2011 | Periyannan et al. | 348/14.09 |
| 2011/0279635 A1 * | 11/2011 | Periyannan et al. | 348/14.09 |
| 2011/0279636 A1 * | 11/2011 | Periyannan et al. | 348/14.09 |
| 2011/0279637 A1 * | 11/2011 | Periyannan et al. | 348/14.09 |
| 2011/0279638 A1 * | 11/2011 | Periyannan et al. | 348/14.09 |
| 2011/0279639 A1 * | 11/2011 | Anand et al. | 348/14.09 |
| 2011/0283203 A1 * | 11/2011 | Periyannan et al. | 715/753 |
| 2012/0242776 A1 * | 9/2012 | Tucker et al. | 348/14.03 |
| 2013/0061062 A9 * | 3/2013 | Saito | 713/193 |
| 2014/0092203 A1 * | 4/2014 | Periyannan et al. | 348/14.09 |
| 2014/0098180 A1 * | 4/2014 | Periyannan et al. | 348/14.09 |

FOREIGN PATENT DOCUMENTS

| | | |
|---|---|---|
| EP | 1830568 A2 | 9/2007 |
| GB | 2349055 A | 10/2000 |
| WO | WO9424803 A1 | 10/1994 |

* cited by examiner

SYSTEMS AND METHODS FOR SECURITY AND PRIVACY CONTROLS FOR VIDEOCONFERENCING

RELATED APPLICATIONS

This application claims priority to U.S. Provisional Patent Application No. 61/334,043, filed May 12, 2010, and entitled "Systems and methods for virtualized video conferencing across multiple standard and proprietary standards," and is hereby incorporated herein by reference.

This application claims priority to U.S. Provisional Patent Application No. 61/334,045, filed May 12, 2010, and entitled "Systems and methods for virtual media room for video conferencing," and is hereby incorporated herein by reference.

This application claims priority to U.S. Provisional Patent Application No. 61/334,050, filed May 12, 2010, and entitled "Systems and methods for distributed global infrastructure to support virtualized video conferencing," and is hereby incorporated herein by reference.

This application claims priority to U.S. Provisional Patent Application No. 61/334,054, filed May 12, 2010, and entitled "Systems and methods for customized user experience to virtualized video conferencing," and is hereby incorporated herein by reference.

BACKGROUND

Videoconferencing in the enterprise has seen rapid growth in recent years as businesses have become global and employees interact with a large ecosystem of remote employees, partners, vendors and customers. At the same time, availability of cheap software solutions in the consumer sector and widespread availability of video cameras in laptop and mobile devices has fueled wide adoption of video chat to stay connected with family and friends.

However, the landscape of options available for videoconferencing remains fragmented into isolated islands that cannot communicate well with each other. Within the enterprise there are hardware based conference rooms equipped with videoconferencing systems from vendors such as Polycom, Tandberg and LifeSize, and high end Telepresence systems popularized by vendors such as Cisco. At the lower end of the price spectrum are software based enterprise videoconferencing applications such as Microsoft's Lync as well as consumer video chat applications such as Skype, GoogleTalk and Apple's FaceTime.

There are significant trade-offs between price, quality and reach when choosing to use any of the above systems for a video call. Large corporations invest hundreds of thousands of dollars in their Telepresence systems to achieve low latency, high-definition calls but can only reach a small subset of people that have access to similar systems. Medium sized businesses invest tens of thousands of dollars in their hardware based systems to achieve up to 720p High Definition (HD) quality. They buy hardware Multi-Party Conferencing Units (MCU) worth hundreds of thousands of dollars with a fixed number of "ports" and use these to communicate between their different branch offices, but are at a loss when it comes to communicating easily with systems outside their company. Companies that cannot afford these settle for lower quality best-effort experiences using clients such as Skype, but on the flip side are able to easily connect with others whether they be inside or outside their own companies. Average users find these trade-offs when using videoconferencing too complicated to understand compared to audio calls using mobile or landline telephones that "just work" without them thinking about all of these trade-offs. As a result there is low adoption of videoconferencing in business even though the technology is easily available and affordable to most people.

Today, more than ever before, there is a need for a service that removes this tradeoff and provides a high-quality video call at almost the price of an audio call without the user having to think about complicated trade-offs. Such a service would connect disparate hardware and software videoconferencing and chat systems from different vendors, talking different protocols (H.323, SIP, XMPP, proprietary) and have different video and audio codecs talk to each other. It would offer very low latency and a much better viewing experience than current solutions. It would be hosted in the Internet/cloud, thereby removing the need for complicated equipment with significant capital and operating investment within the enterprise. Ease of use would be as simple as setting up an audio conference call without the need for complicated provisioning arrangements from corporate IT.

The foregoing examples of the related art and limitations related therewith are intended to be illustrative and not exclusive. Other limitations of the related art will become apparent upon a reading of the specification and a study of the drawings.

DETAILED DESCRIPTION OF EMBODIMENTS

Figure 1:
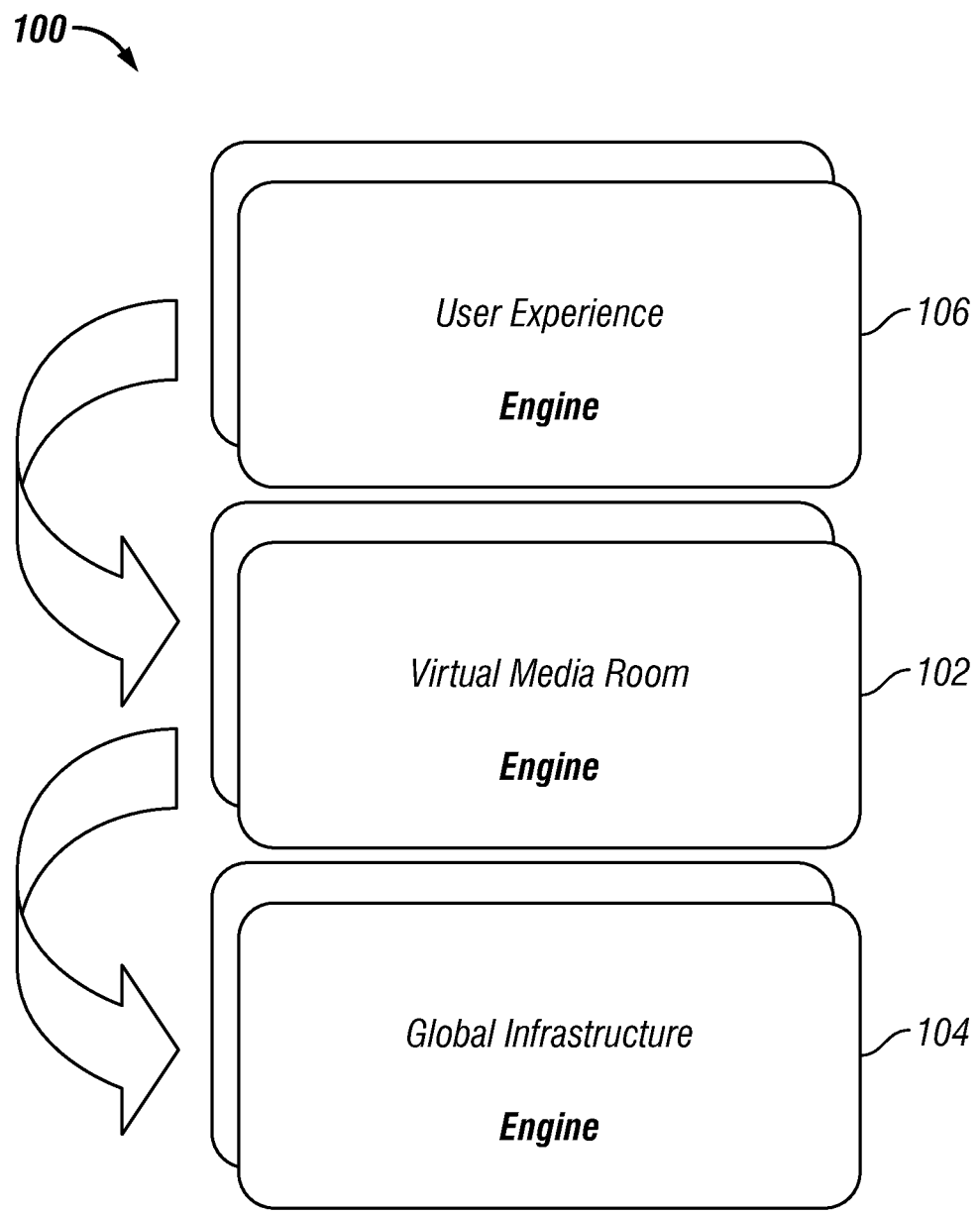
FIG. 1 depicts an example of a system to support operations of a virtual meeting room (VMR) across multiple standard and proprietary video conference systems.

The approach is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

A new approach is proposed that contemplates systems and methods to support the operation of a Virtual Media Room or Virtual Meeting Room (VMR), wherein each VMR can accept from a plurality of participants at different geographic locations a variety of video conferencing feeds of audio, video, presentation and other media streams from video conference endpoints and other multimedia-enabled devices that can be either proprietary or standards-based and enable a multi-party or point-to-point video conferencing session among the plurality of participants. For non-limiting examples, video feeds from proprietary video conference endpoints include but are not limited to, Skype, while video feeds from standards-based video conference endpoints include but are not limited to, H.323 and SIP. Each single VMR can be implemented and supported across an infrastructure of globally distributed set of commodity servers acting as media processing nodes co-located in Points of Presence (POPs) for Internet access, wherein such massively distributed architecture can support thousands of simultaneously active VMRs in a reservation-less manner and yet is transparent to the users of the VMRs. Each VMR gives its users a rich set of conferencing and collaboration interaction hitherto not experienced by video conferencing participants. These interactions encompass controlling of a video conferencing session, its configuration, the visual layout of the conferencing participants, customization of the VMR and adaptation of the room to different vertical applications. For a non-limiting example, one such use of the VMR is to facilitate point-to-point calls between two disparate endpoints such as a Skype client and a standards-based H,323 endpoint wherein the Skype user initiates a call to another user with no knowledge of the other user's endpoint technology and a VMR is automatically provisioned between the two parties after determining the need for the translation needed between the two endpoints.

The approach further utilizes virtual reality and augmented-reality techniques to transform the video and audio streams from the participants in various customizable ways to achieve a rich set of user experiences. A globally distributed infrastructure supports the sharing of the event among the participants at geographically distributed locations through a plurality of MCUs (Multipoint Control Unit), each configured to process the plurality of audio and video streams from the plurality of video conference endpoints in real time.

Compared to conventional video conferencing systems that require every participant to the video conference to follow the same communication standard or protocol, a VMR allows the users/participants of a video conference to participate in a multi-party or point-to-point video conferencing session in device and protocol independent fashion. By conducting manipulation of the video and audio streams transparently in the Internet/cloud without end user involvement, the proposed approach brings together video conference systems of different devices and protocols of video conferencing and video chat that exist in the world today as one integrated system.

Hosting the VMR in the Internet/cloud allows for the participants to initiate a call to anyone and have the VMR ring them at all their registered endpoint devices and have the callee pick up the call from any endpoint device that they wish to transparently. A VMR hosted in the Internet/cloud enables any participant to upload media content to the cloud and have it be retransmitted to other participants in formats of their choice, with or without modifications.

FIG. 1 depicts an example of a system 100 to support operations of a VMR across multiple standard and proprietary video conference systems. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts or several virtualized instances on one or more hosts, and wherein the multiple hosts can be connected by one or more networks geographically distributed anywhere in the world.

In the example of FIG. 1, the system 100 includes at least a VMR engine 102 that operates the VMRs, a global infrastructure engine 104 that supports the operations of the VMRs, and a user experience engine 106 that enhance the users' experience of the VMRs.

As used herein, the term engine refers to software, firmware, hardware, or other component that is used to effectuate a purpose. The engine will typically include software instructions that are stored in non-volatile memory (also referred to as secondary memory). When the software instructions are executed, at least a subset of the software instructions is loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

In the example of FIG. 1, each of the engines can run on one or more hosting devices (hosts). Here, a host can be a computing device, a communication device, a storage device, or any electronic device capable of running a software component. For non-limiting examples, a computing device can be but is not limited to a laptop PC, a desktop PC, a tablet PC, an iPad, an iPod, an iPhone, iTouch, Google's Android device, a PDA, or a server machine that is a physical or virtual server and hosted in an Internet public or private data center by a service provider or a third party for the service provider or inside an enterprise's private data center or office premises. A storage device can be but is not limited to a hard disk drive, a flash memory drive, or any portable storage device. A communication device can be but is not limited to a mobile phone.

In the example of FIG. 1, each of the VMR engine 102, global infrastructure engine 104, and user experience engine 106 has one or more communication interfaces (not shown), which are software components that enable the engines to communicate with each other following certain communication protocols, such as TCP/IP protocol, over one or more communication networks. Here, the communication networks can be but are not limited to, internet, intranet, wide area network (WAN), local area network (LAN), wireless network, Bluetooth, WiFi, and mobile communication networks. The physical connections of the network and the communication protocols are well known to those of skill in the art.

Figure 2:
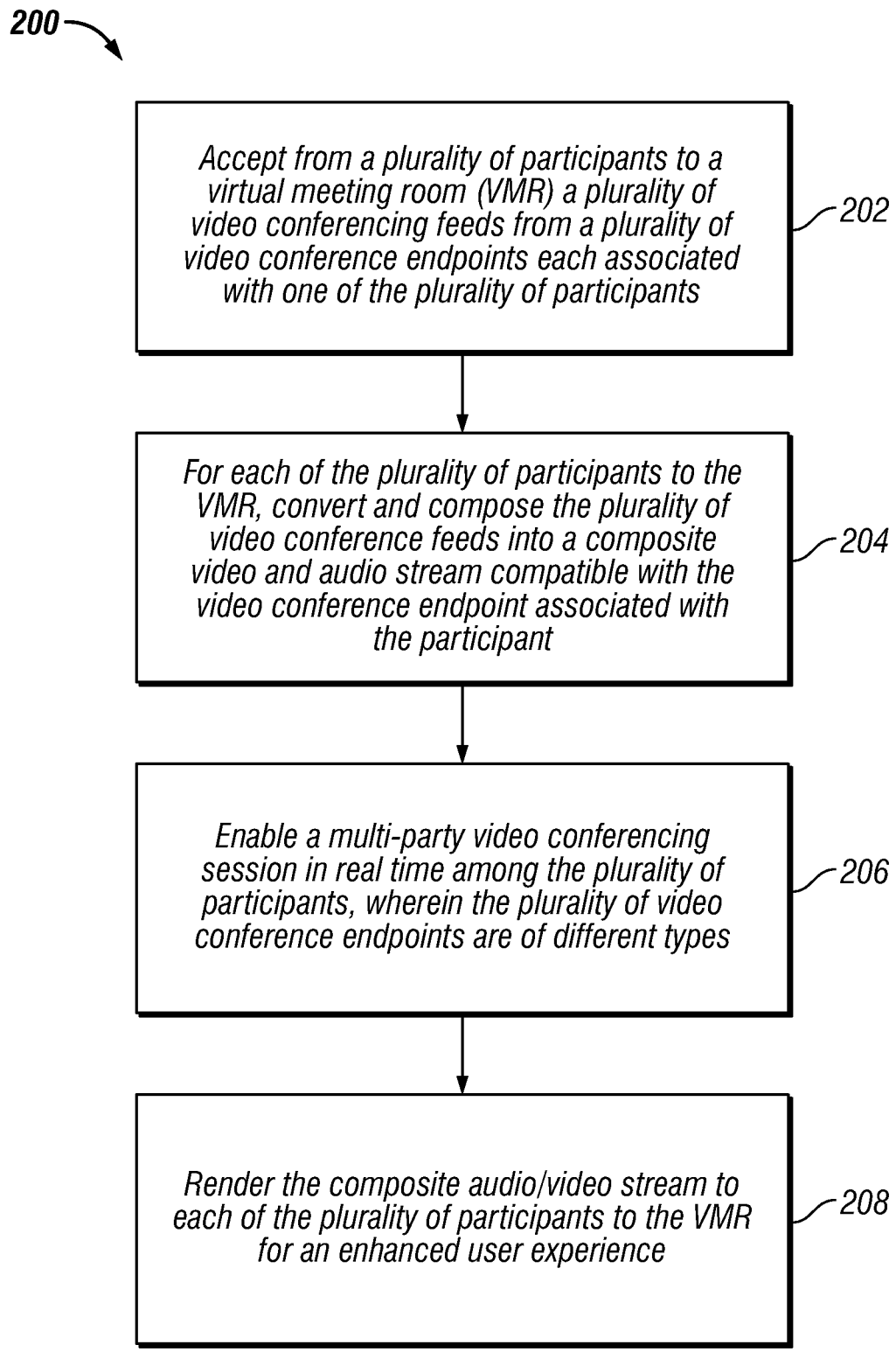
FIG. 2 depicts a flowchart of an example of a process to operations of a VMR across multiple standard and proprietary video conference systems.

FIG. 2 depicts a flowchart of an example of a process to operations of a VMR across multiple standard and proprietary video conference systems. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 2, the flowchart 200 starts at block 202 where accepting from a plurality of participants a plurality of video conferencing feeds from a plurality of video conference endpoints each associated with one of the plurality of participants to a virtual meeting room (VMR) are accepted. The flowchart 200 continues to block 204 where, for each of the plurality of participants to the VMR, the plurality of video conference feeds are converted and composed into a composite video and audio stream compatible with the video conference endpoint associated with the participant. The flowchart 200 continues to block 206 where a multi-party video conferencing session is enabled in real time among the plurality of participants is enabled, wherein the plurality of video conference endpoints are of different types. The flowchart 200 ends at block 208 where the composite audio and video stream is rendered to each of the plurality of participants to the VMR for an enhanced user experience.

Virtual Meeting/Media Room (VMR)

In the example of FIG. 1, VMR engine 102 allows participants to a video conference room to participate via all types of video conferencing endpoints. VMR engine 102 coalesces the video conferencing feeds from the vagaries of different manufacturers' video equipment and/or software implementations of video conferencing systems and endpoints in real time in order to effectively handle a multi-party video conferencing session. More specifically, VMR engine 102 converts and composes in real time the plurality of video conference feeds from the participants to a VMR to a composite video and audio stream compatible with each of the video conference endpoints, i.e., the video conference system associated with each of the participants to the VMR. Here, the conversion of the video conference feeds includes at least one or more of the following areas of the video conference feeds:

Video encoding formats (e.g., H.264, proprietary, etc.)
Video encoding profiles and levels (e.g. H264 Main Profile, H264 Constrained Baseline Profile, etc.)
Audio encoding formats (e.g., SILK, G7xx, etc.)
Communication protocols (e.g., H.323, SIP, XMPP, proprietary, etc.)
Video resolutions (e.g., QC/SIF, C/SIF, Q/VGA, High Definition—720p/1080p, etc.)
Screen ratios (e.g., 4:3, 16:9, custom, etc.)
Bitrates for audio streams (e.g. narrowband, wideband, etc.)
Bitrates for video streams (e.g. 1.5 Mbps, 768 kbps, etc.)
Encryption standards (e.g., AES, proprietary, etc.)
Acoustic considerations (e.g., echo cancellations, noise reduction, etc.)

The technologies involved for the conversion of the video conference feeds include but are not limited to, transcoding, upscaling downscaling, transrating, mixing video and audio streams, adding and removing video, audio and other multimedia streams, noise reduction and automatic gain control (AGC) of the video conference feeds.

In some embodiments, VMR engine 102 will facilitate point-to-point calls between two disparate endpoints such as a Skype client and a standards-based H.323 endpoint wherein the Skype user initiates a call to another user with no knowledge of the other user's endpoint technology and a VMR is automatically provisioned between the two parties after determining the need for the translation needed between the two endpoints. In this case the VMR is used to allow two endpoints to communicate without the users needing to know or worry about the differences between the protocols, video encodings, audio encodings or other technologies used by the endpoints.

In some embodiments, VMR engine 102 composes and renders the composite video and audio stream to closely match the capabilities of the video conferencing endpoint associated with each of the participants in order for the participant to have an effective meeting experience. When compositing the frames of the video and audio stream for final rendition, VMR engine 102 may take into consideration the innovative video layouts of the participants as well as the activity of various participants to the video conference. For a non-limiting example, VMR engine 102 may give more prominence to the active speaker at the conference relative to other participants. In some embodiments, VMR engine 102 may also accommodate multimedia data streams/content accompanying the video conference feeds as part of the composite audio/video steam for collaboration, wherein multimedia data streams may include but are not limited to, slides sharing, whiteboards, video streams and desktop screens. Chat style messages for real time communication amongst the participants is also supported. Participant status information including but not limited to the type of endpoint used, signal quality received and audio/video mute status could also be displayed for all of the participants.

Figure 3:
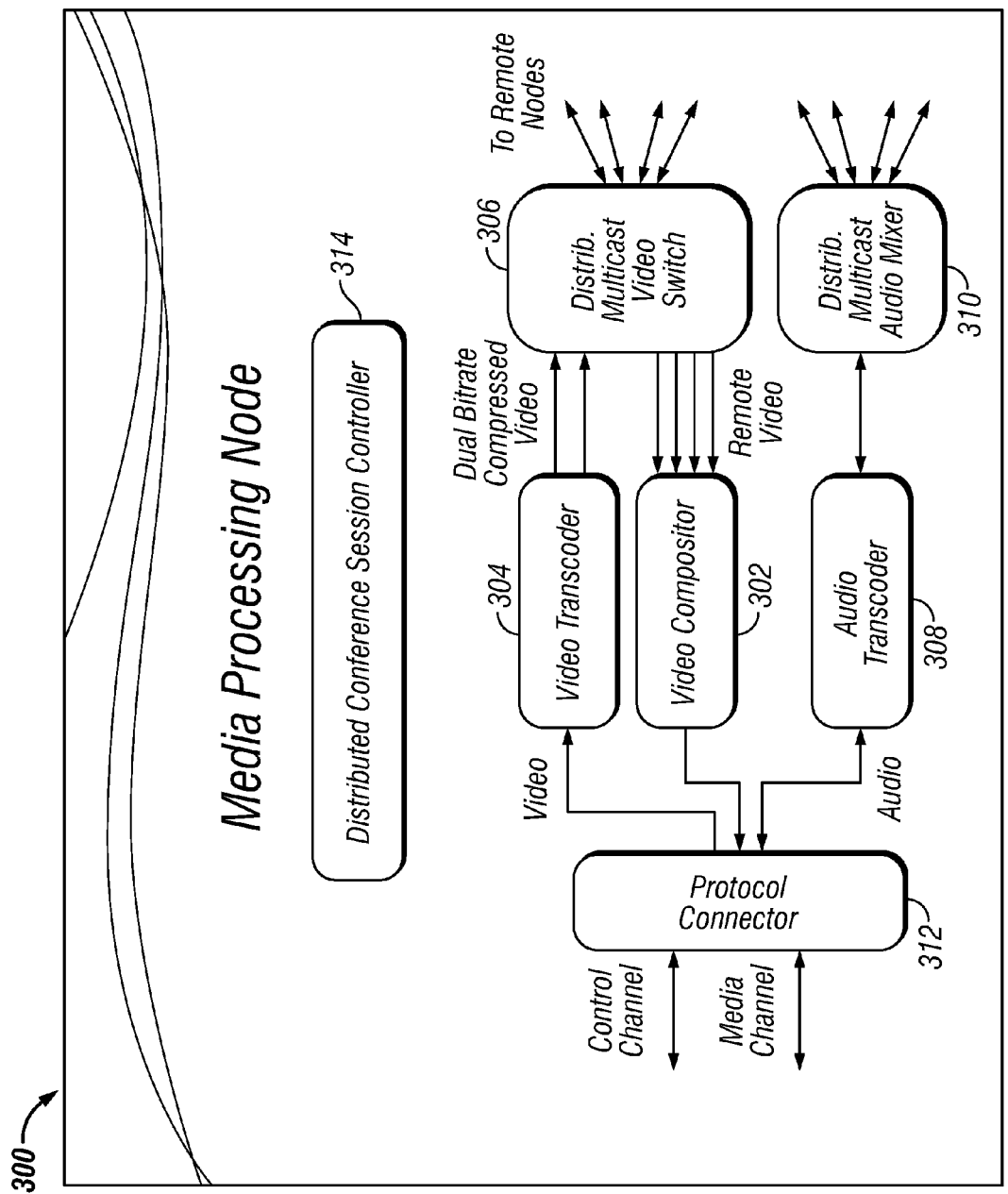
FIG. 3 depicts an example of various components of a media processing node.

In some embodiments, media processing node 300 is designed to convert and compose several video conference feeds of video and audio streams in real-time to create and render one or more composite multimedia streams for each participant to the VMR. As shown in the example depicted in FIG. 3, media processing node 300 may include as its components one or more of: video compositor 302, video transcoder 304, distributed multicast video switch 306, audio transcoder/pre-processor 308, distributed multicast audio mixer 310, protocol connector 312, and a distributed conference session controller 314. In the case of video, the video streams from the participants are made available at the media processing node 300 in three (or more) forms:

original compressed video
uncompressed raw video
a lower resolution compressed thumbnail video In the example of FIG. 3, video compositor 302 of media processing node 300 subscribes to whichever video stream it needs based on the set of videos needed to be composed and rendered to the participants. The two (or more) compressed forms of the video streams listed above are transcoded by video transcoder 304 sent by distributed multicast video switch 306 using a multicast address on the network so that other (remote) media processing nodes that want these video streams can subscribe to them as needed. This scheme allows the entire cluster of nodes (locally and globally) to share and/or exchange the audio and video streams they need in the most efficient manner. These streams could be transmitted over the public internet, over a private network or over a provisioned overlay network with service level guarantees. Using this approach, video compositor 302 may show various composites, including but limited to, just the active speaker, two people side-by-side if they are having a conversation, and any other custom format as requested by a participant, which may include transformations of the video into other representations as well.

In the example of FIG. 3, video transcoder 304 of media processing node 300 encodes and decodes composite video streams efficiently, where characteristics of each individual stream can be extracted during decoding. Here, video transcoder 304 gathers knowledge provided by the coded bitstream of the composite video streams, wherein such gathered information include but are not limited to:

Motion Vectors (MVs)
   cbp and skip.
   Static macro blocks (0 motion vector and no cbp)
   quantization value (Qp)
   frame rate.

These characteristics are used to build up a metadata field associated with the uncompressed video stream as well as a synthetic stream of compressed or otherwise transformed data.

In some embodiments, video compositor 302 not only composes the raw video stream into a composite video stream but also builds up a composite metadata field in order to apply similar operations (including both 2D and 3D operations) outlined in the metadata field to the individual video streams of the composite video. For a non-limiting example, motion vectors need to be applied with the same transformation that video compositor 302 may apply to each raw video stream, including but not limited to, scaling, rotation, translation, shearing. This metadata could be used for other non-real-time multimedia services including but not limited to recorded streams and annotated streams for offline search and indexing.

Figure 4A:
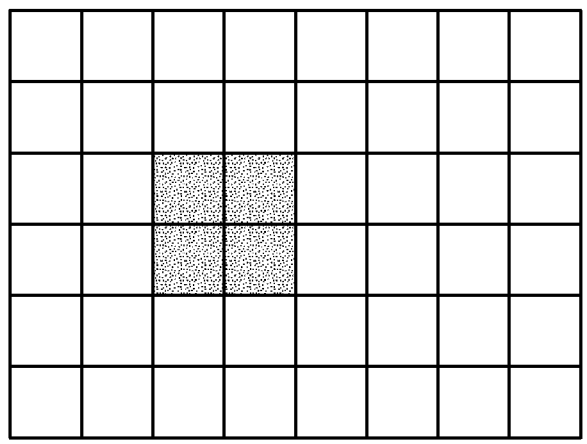
FIGS. 4(a)-(b) depict diagrams of examples of media encoding under a simple dyadic scenario.
Figure 4A:
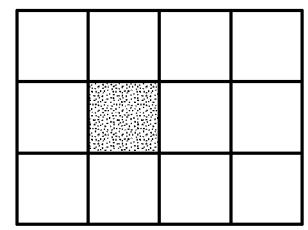
Figure 4B:
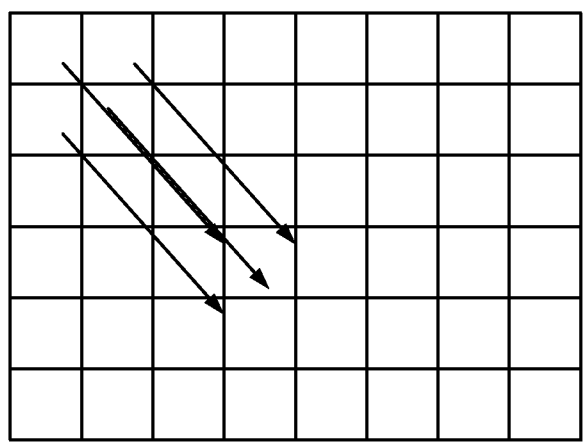
Figure 4B:
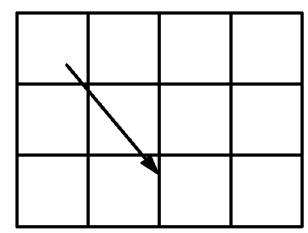

FIGS. 4(a)-(b) depict diagrams of examples of media encoding under a simple dyadic scenario of where the input is scaled down by a factor of two, where FIG. 4(a) illustrates how macro blocks (MB) are treated and FIG. 4(b) illustrates how motion vector are processed. Here, video compositor 402 does its best to align raw videos on macro block's boundary for best result. For that purpose, layouts used by video compositor 402 are chosen judiciously to minimize the amount of macro blocks covered by a video stream while maintaining the target size of the video. Optionally video compositor 402 may mark the boundary area of video feeds as such since these feeds typically contains less information in the context of video conferencing. This metadata field could include information such as the positions of speakers in the video stream who can then be segmented and compressed separately. The composite metadata field is then processed to provide meaningful information on a macro block basis and to best match the encoding technology. For non-limiting examples, In the case of H.264, the processing takes into account the fact that macro blocks can be subdivided down to 4×4 sub-blocks.
   In the case of H.263, the macro blocks cannot be subdivided or can only be subdivided in 8×8 blocks depending of the annexes used.
   In the case of H.261, the macro blocks are not subdivided.

In some embodiments, video transcoder 304 is given the composite raw video and composite metadata field and video transcoder 304 then uses the knowledge provided by the metadata field to reduce computation and focus on meaningful area. For non-limiting examples:

Skip macro block detection: extremely fast skip macro block detection can be achieved by choosing skip automatically if the composite metadata point to a static MB.
   MV search range: search range of MV can be dynamically adapted based on composite metadata field information. The search range is directly evaluated based on the MV on the matching MB in the metadata field.
   MV predictor: the MV indicated in the composite metadata field is used as a primary predictor during motion estimation.
   Quantization: the quantization value (Qp) used during encoding is bounded by the value provided in the composite metadata field.
   Frame rate adaptation. area of the composite with lower frame rate are marked as skipped when no update for that frame rate is given
   Area of composite with no motion gets fewer bits.
   Areas on the border of each video are encoded with fewer bits.

In the case of audio, audio transcoder/pre-processor 308 mixes each participant's audio stream along with the audio streams from other participants received at media processing node 300 through distributed multicast audio mixer 310. The mixed output can also be sent over the network via distributed multicast audio mixer 310 so that all other nodes that want to receive this stream may subscribe to it and mix it in with the local streams on their media processing nodes. Such an approach makes it possible for the global infrastructure engine 104 to provide mixed audio output to all participants in a video conference hosted at a VMR in a distributed manner.

Figure 5:
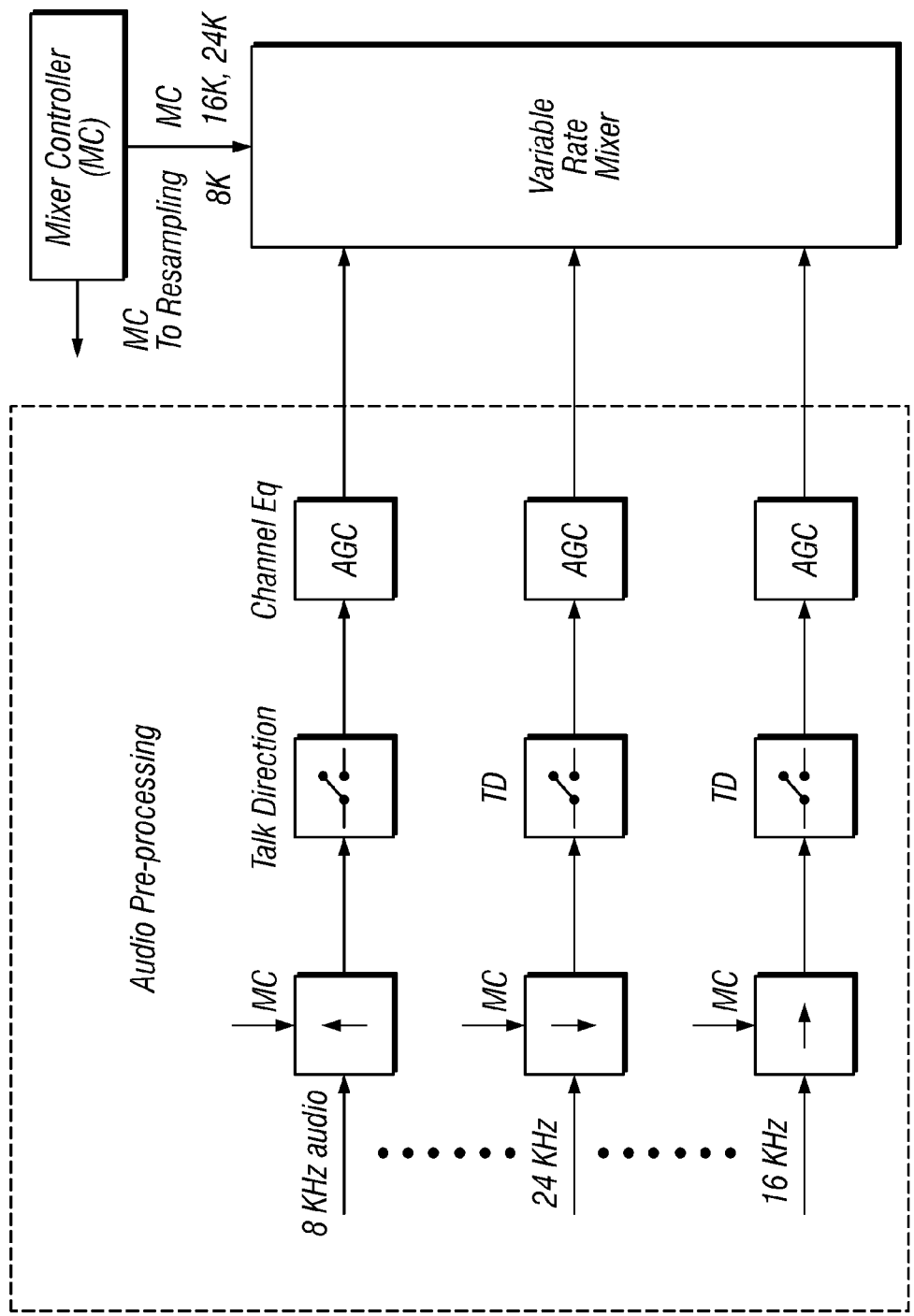
FIG. 5 depicts an example of a diagram for highly scalable audio mixing and sampling.

In some embodiments, audio transcoder/pre-processor 308 enables highly scalable audio mixing that mixes audio signals from various codec at the best sampling rate as shown in the example depicted in the diagram of FIG. 5. More specifically, audio transcoder/pre-processor 308 first determines the best possible sampling rate to mix audio based on the video endpoints associated with participants in a particular VMR. Audio transcoder/pre-processor 308 then estimates noise on each channel coming in and determines voice activities on each channel. Only active channels are mixed to eliminate all noise in the VMR and the channels are equalized to boost signal and reduce noise. Finally, audio transcoder/pre-processor 308 mixes full channels by normalization of channels and creates unique streams for each participant based on all other audio streams in the VMR to eliminate echo on the channel.

In some embodiments, audio transcoder/pre-processor 308 enables real-time language translation and other speech-to-text or speech-to-visual services including but not limited to language-to-English translation and subtitling in real-time, interacting and modifying content in the call through voice commands and pulling in data in real-time from the internet through speech-to-visual services.

Figure 6:
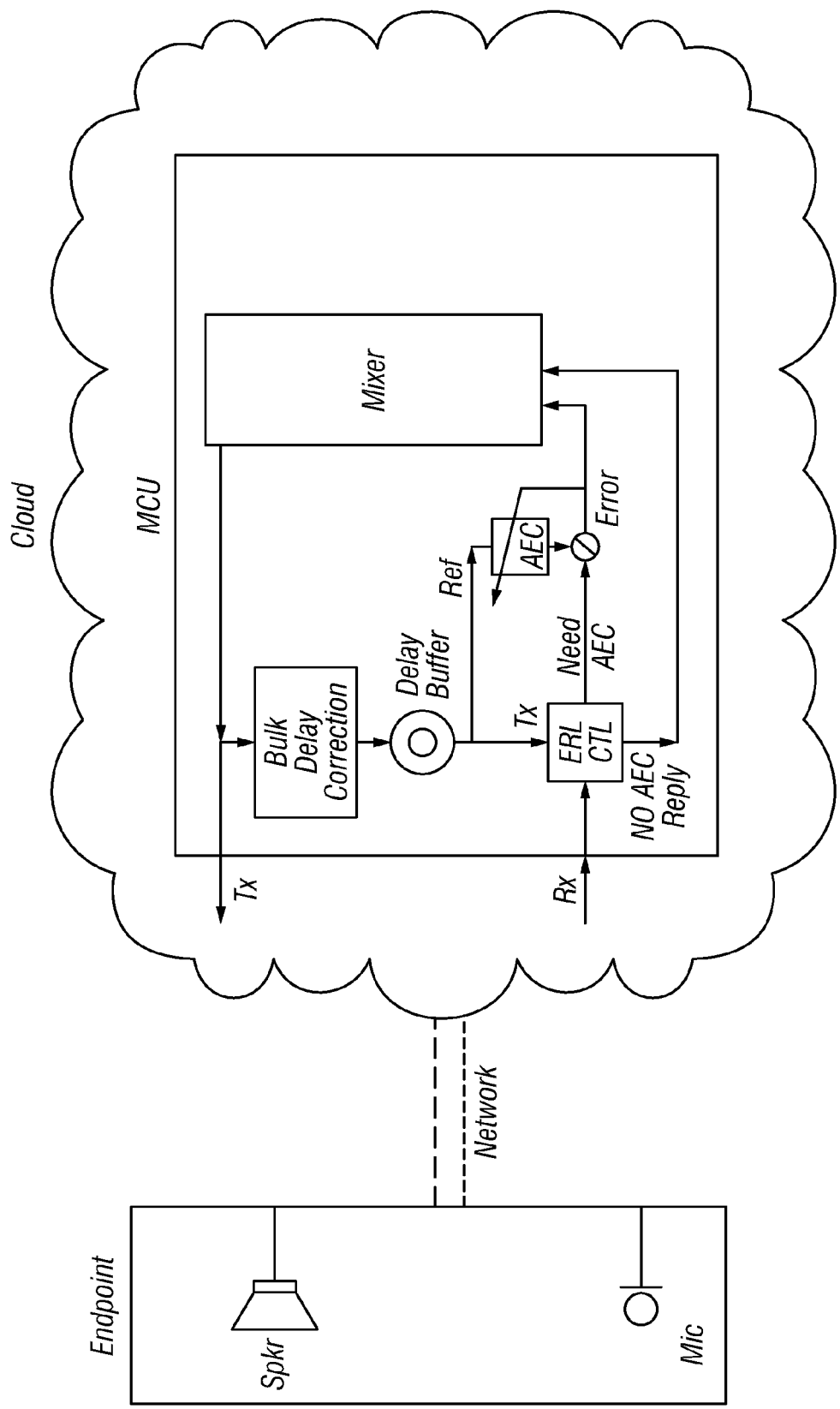
FIG. 6 depicts an example of an Internet/cloud-based audio acoustic echo canceller.

Since bad or non-existent echo cancellation on the part of one or more participants in a conference call often deteriorates the whole conference for everyone in the VMR, in some embodiments, audio transcoder/pre-processor 308 enables automatic Internet/cloud-based determination of the need for acoustic echo cancellation at a video conference endpoint as shown in the example depicted in the diagram of FIG. 6. First, audio transcoder/pre-processor 308 determines the roundtrip delay on the audio stream going out of the MCU to the endpoint and back. Audio transcoder/pre-processor 308 then estimates the long term and short term power consumption on the speaker and microphone signal going out of MCU. The natural loss on the endpoint can then be calculated by the following formula:

$$ERL = \log_{10}(\text{power(Micphone Signal)}/\text{power(Speaker Signal)})$$

If the natural loss of the endpoint is greater than 24 dB, there is no need to do echo cancellation as the endpoint is taking care of echo.

Distributed Infrastructure

Traditional approaches to build an infrastructure for video conferencing that meets these requirements would often demand custom hardware that uses FPGAs (Field Programmable Logic Arrays) and DSPs (Digital Signal Processors) to deliver low latency media processing and to chain the hardware together to handle the large load. Such a customized hardware system is not very flexible in the A/V formats and communication protocols it can handle since the hardware logic and DSP code is written and optimized for a specific set of A/V codecs and formats. Such system can also be very expensive to build requiring large R&D teams and multi-year design cycles with specialized engineering skills.

Supporting the operations of the VMR engine 102 in FIG. 1 requires a multi-protocol video bridging solution known in the industry as a MCU (Multipoint Control Unit) as the media processing node 300 discussed above to process and compose video conference feeds from various endpoints. Traditionally, an MCU is built with custom hardware that ties together 100s of DSPs with special purpose FPGAs, resulting in large MCUs with many boards of DSPs in expensive bladed rack mounted systems. Even with such expensive systems, it is only possible to achieve 10s or 100s of participants connected to an MCU when the participants use HD video. To achieve larger scale, a service provider has to buy many such bladed boxes and put some load balancers and custom scripting together. But such an approach is expensive, hard to manage, hard to program the DSP software and FPGA code used, and hard to distribute seamlessly across the globe. Additionally, such system usually runs a proprietary OS that makes it hard to add third party software and in general provide new features rapidly, and some of the functionality, such as the ability to do flexible compositing for participants in a virtual room when the room spans across multiple MCUs, is lost.

In the example of FIG. 1, global infrastructure engine 104 enables efficient and scalable processing and compositing of media streams by building the MCUs as the media processing nodes for video stream processing from off-the-shelf components, such as Linux/x86 CPUs and PC GPUs (Graphics Processing Units) instead of custom hardware. These MCUs can be deployed in a rack-and-stack cloud-computing style and hence achieves the most scalable and cost/performance efficient approach to support the VMR service. The x86 architecture has improved vastly over the last 5 years in its Digital Signal Processing (DSP) capabilities. Additionally, off-the-shelf Graphics Processing Units (GPU) used for rendering PC graphics can be used to augment the processing power of the CPU.

In the example of FIG. 1, global infrastructure engine 104 that supports and enables the operations of the VMRs has at least one or more of the following attributes:
 Ability to support wide variety of audio video formats and protocols;
 Scalable mixing and composition of the audio and video streams;
 Service delivered across the globe with minimized latency;
 Capital efficient to build and cost efficient to operate.

In some embodiments, global infrastructure engine 104 enables to cluster the x86 servers both locally on a LAN as well as across geographies as the media processing nodes 300 for the MCUs to achieve near unlimited scaling. All of the media processing nodes 300 work together as one giant MCU. In some embodiments, such clustered MCU design makes use of network layer multicast and a novel multi-bit-rate stream distribution scheme to achieve the unlimited scaling. Under such design, global infrastructure engine 104 is able to achieve great scalability in terms of number of participants per call, geographic distribution of callers, as well as distribution of calls across multiple POPs worldwide.

In some embodiments, global infrastructure engine 104 distributes the MCUs around the globe in Points of Presence (POPs) at third party data centers to process video conference feeds coming from video conference endpoints having different communication protocols. Each POP has as much processing power (e.g., servers) as required to handle the load from that geographical region the POP is located. Users/participants connecting to the video conference system 100 are directed by the global infrastructure engine 104 to the closest POP (the "connector") so as to allow them to minimize their latency. Once the participants reach the POP of the global infrastructure engine 104, their conference feeds of audio and video streams can be carried on a high performance network between the POPs. Such distributed infrastructure of global infrastructure engine 104 enables the biggest media processing engine (VMR engine 102) ever built to act as one single system 100. Such a system would take a lot of capital costs, R&D costs and immense amount of operation scripting coordination if it were to be built using the traditional approach of DSP/FPGA-based custom hardware.

Figure 7A:
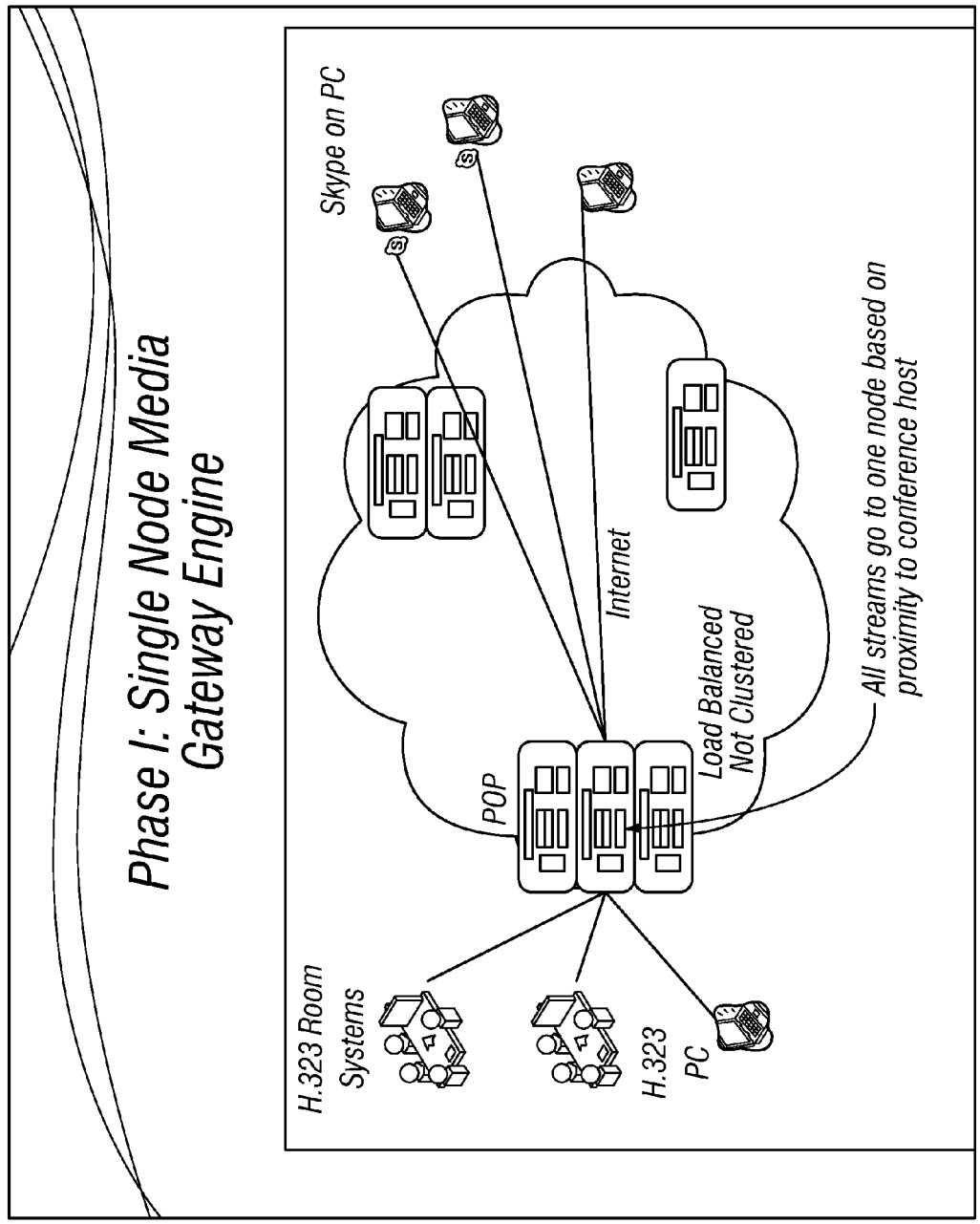
FIGS. 7(a)-(c) depict an example of a multi-phased media stream distribution process achieved locally on a LAN present in each POP or across multiple POPs on the WAN.
Figure 7B:
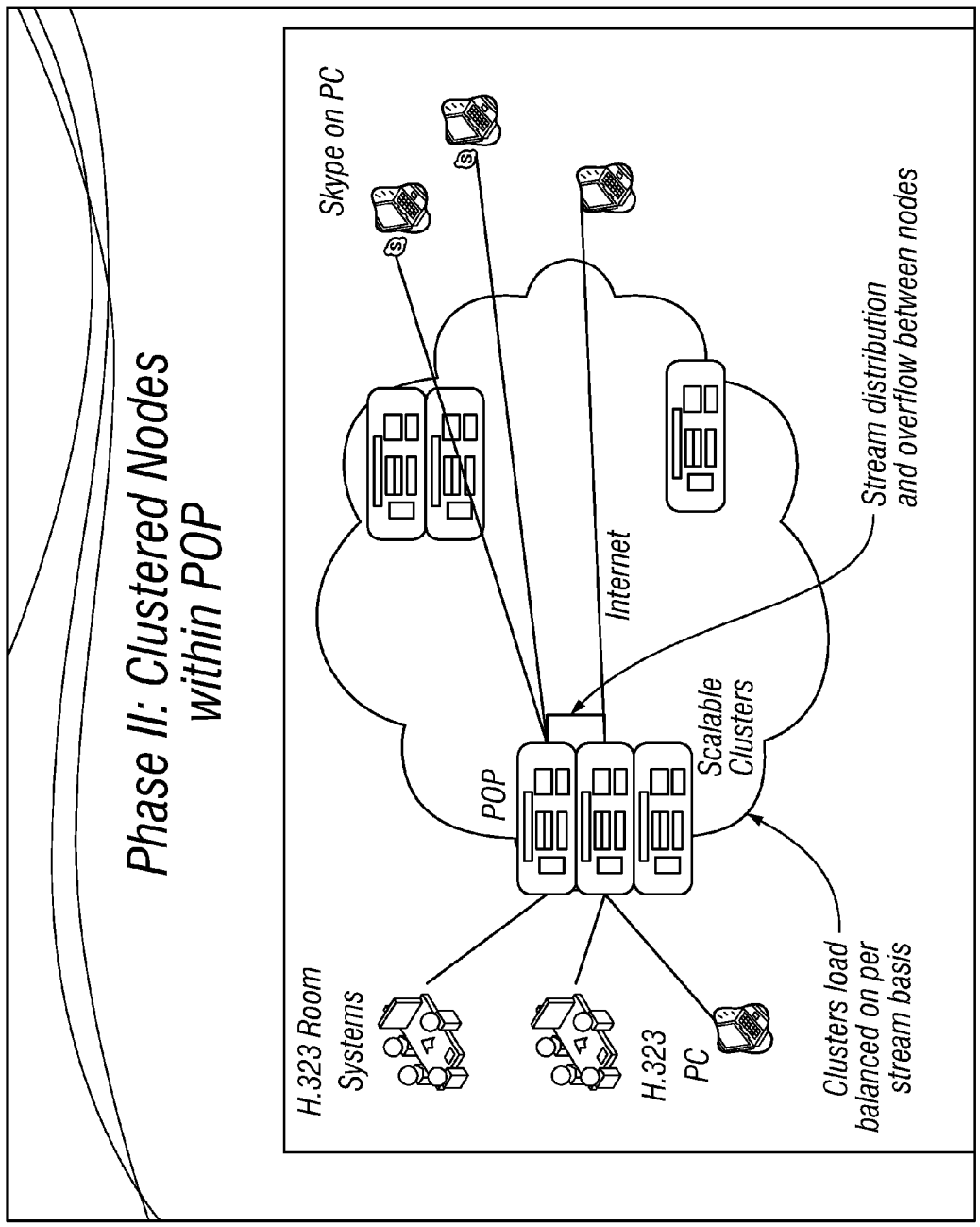
Figure 7C:
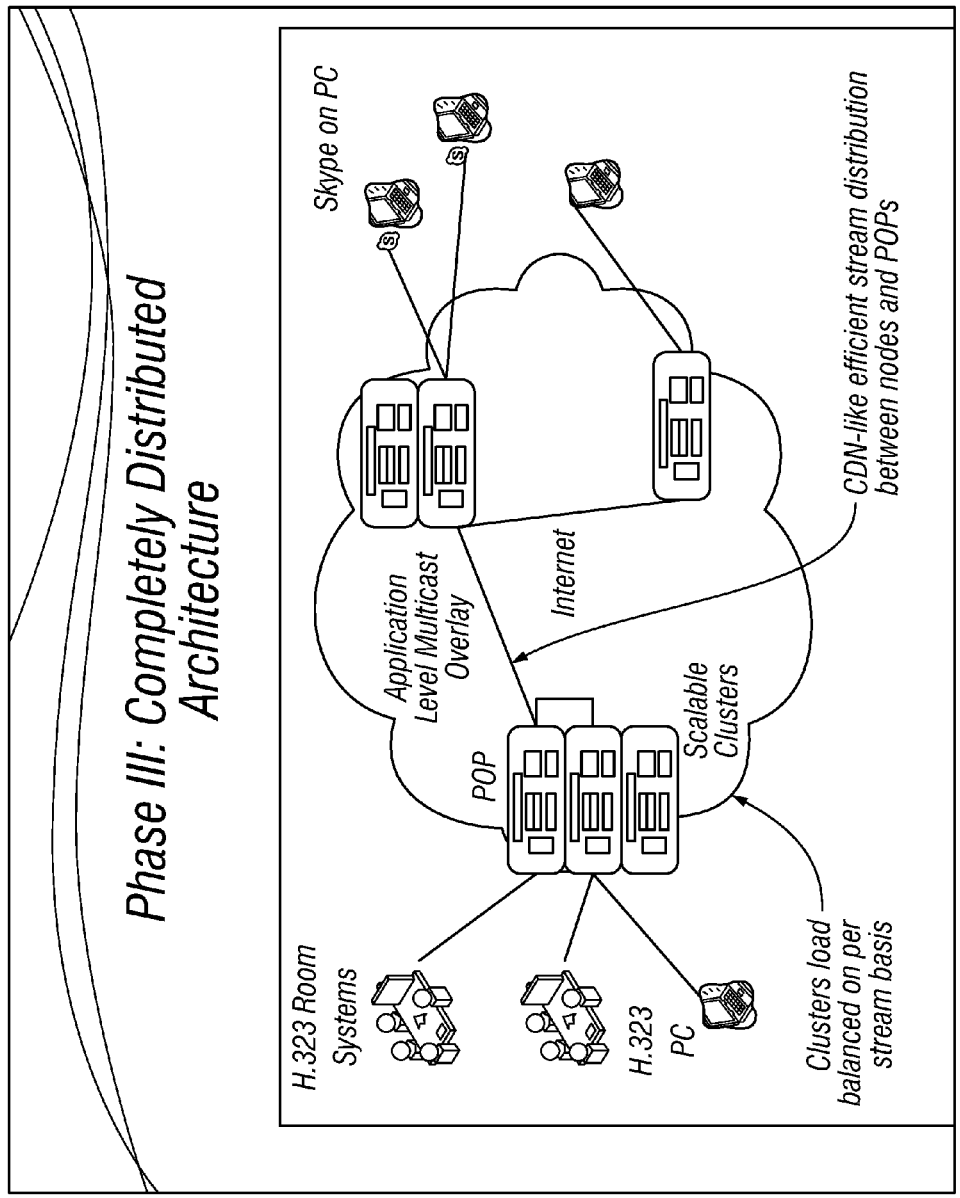

FIGS. 7(a)-(c) depict an example of a multi-phased media stream distribution process achieved locally on a LAN present in each POP or across multiple POPs on the WAN (Wide Area Network). FIG. 7(a) depicts Phase I of media stream distribution—single node media distribution with a POP, where video conference feeds from participants to a video conference via for non-limiting examples, room systems running H.323, PCs running H.323, PCs running Skype, all connect to one node in a POP based on proximity to conference host, where the video conference feeds are load balanced but not clustered among nodes in the POP. FIG. 7(b) depicts Phase II of media stream distribution—clustered nodes media distribution with a POP, wherein video conference feeds from the participants are load balanced among cluster of nodes at the POP, and the audio/video streams are distributed/overflowed among the nodes in the POP. FIG. 7(c) depicts Phase III of media stream distribution—complete media distribution among both the cluster of nodes with the POP and among different POPs as well, where some participants to the conference may connect to their closest POPs instead of a single POP.

In some embodiments, the global infrastructure engine 104 may allow for multiple other globally distributed private networks to connect to it, including but not limited to deployments of videoconferencing services such as Microsoft Lync that require federation (i.e. cooperation among multiple organizational entities) at edge nodes and translation and decoding of several communication and transport protocols.

In some embodiments, global infrastructure engine 104 may limit video conference feed from every participant to a video conference to go through a maximum of two hops of media processing nodes and/or POPs in the system. However, it is possible to achieve other types of hierarchy with intermediate media processing nodes that do transcoding or transcode-less forwarding. Using this scheme, global infrastructure engine 104 is able to provide pseudo-SVC (Scalable Video Coding) to participants associated with devices that do not support SVC, i.e., each of the participants to the video conference supports AVC (Audio-Video Coding) with appropriate bit rate upshift/downshift capabilities. The global infrastructure engine 104 takes these AVC streams and adapts them to multi-bit-rate AVC streams inside the media distribution network. Under this scheme, it is still possible to use SVC on the devices that support SVC. It is also possible to use SVC on the internal network instead of multi-bit-rate AVC streams as such network adapts and grows as the adoption of SVC by the client devices of the participants increases.

Figure 8:
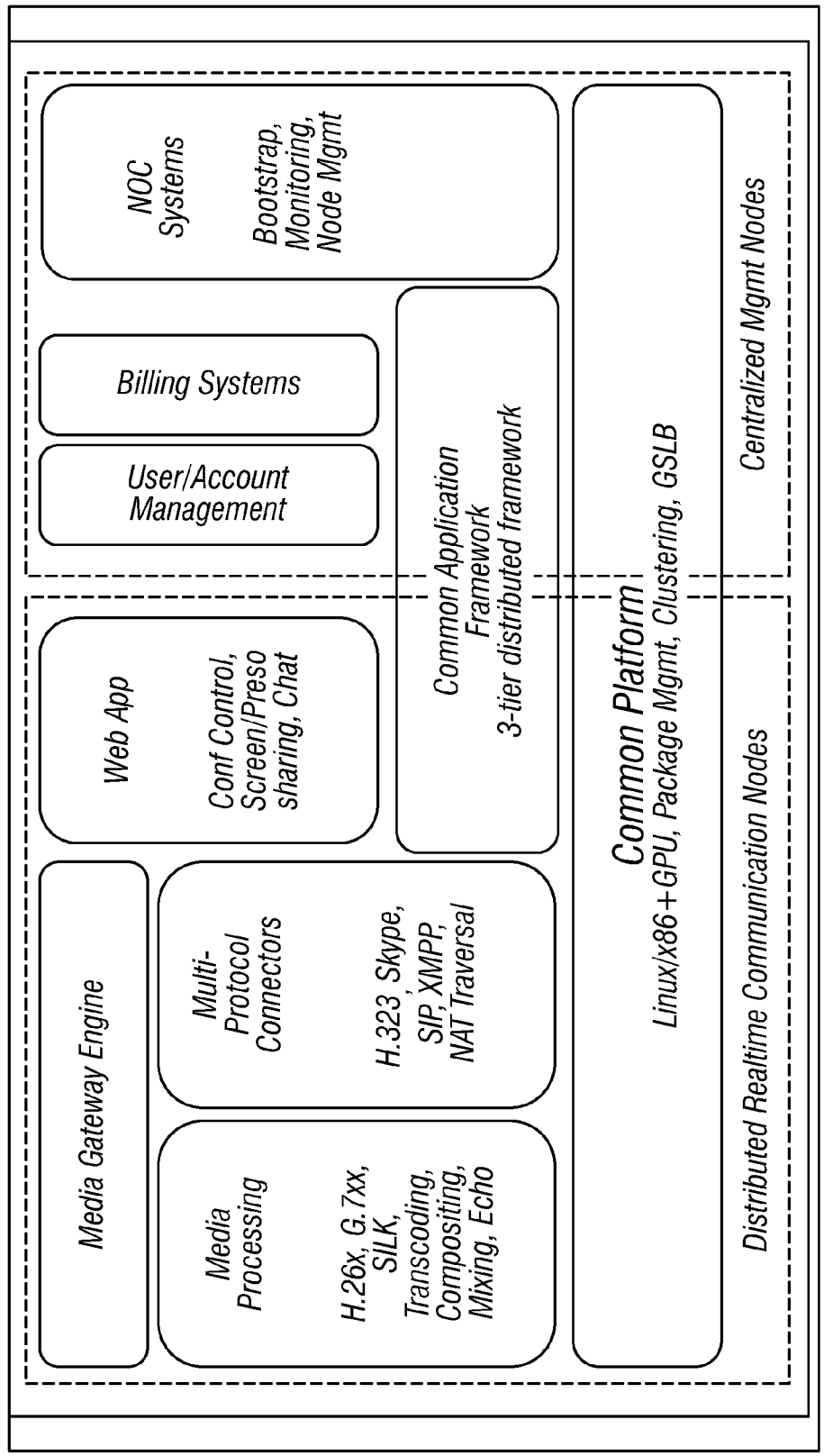
FIG. 8 depicts examples of software components of global infrastructure engine to support the VMR.

FIG. 8 depicts examples of software components of global infrastructure engine 104 to support the operation of the VMR. Some of these components, which include but are not limited to, media gateway engine, media processing engine for transcoding, compositing, mixing and echo cancellation among H.26x, G.7xx, and SILK, multi-protocol connectors among H.323, Skype, SIP, XMPP, and NAT traversal, Web applications such as conference control, screen and presentation sharing, chat, etc., are distributed across the nodes and POPs of the global infrastructure engine 104 for real-time communication. Some components, which include but are not limited to, user/account management, billing system, NOC (Network operation center) systems for bootstrapping, monitoring, and node management are run at one or more centralized but redundant management nodes. Other components, which include but are not limited to, common application framework and platform (e.g., Linux/x86 CPUs, GPUs, package management, clustering) can be run on both the distributed nodes and the centralized management nodes.

Whenever input is accepted over an open network to a service, especially from un-trusted sources, strong validation must occur in order to prevent security breaches, denial of service attacks, and general instability to the service. In the case of video conferencing, the audio/video stream input from a conferencing endpoint that needs to be validated may include control protocol messages and compressed media streams, both of which must be validated. While it is important that the code handling the un-trusted input be responsible for doing validation and sanity checks before allowing it to propagate through the system, history has shown that relying on this as the only validation strategy is insufficient. For a non-limiting example, H.323 heavily utilizes Abstract Syntax Notation One (ASN.1) encoding, and most public ASN.1 implementations have several security issues over the years and ASN.1's complexity makes it nearly impossible to hand-code a parser that is completely secure. For another non-limiting example, many implementations for H.264 video decoders do not contain bounds checks for performance reasons, and instead contain system-specific code to restart the codec when it has performed an invalid memory read and triggered a fault.

Figure 9:
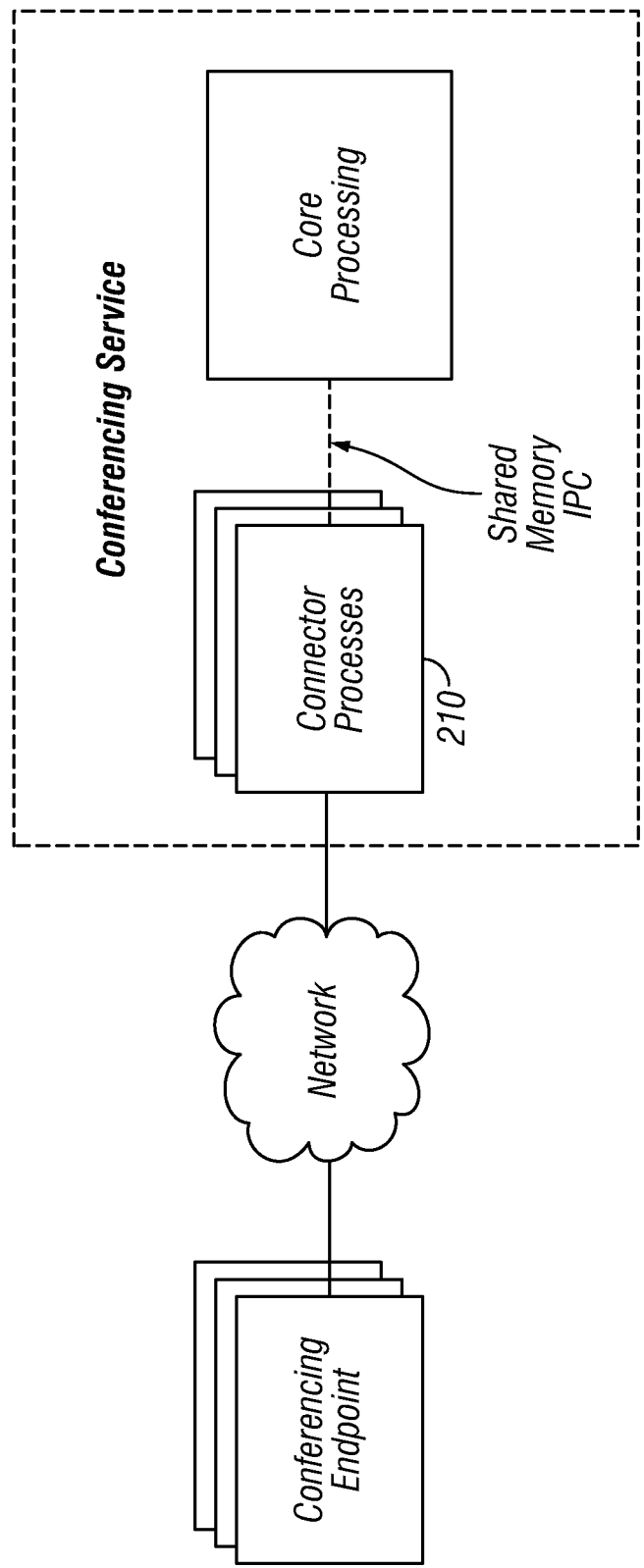
FIG. 9 depicts an example illustrating a high-level mechanism for fault tolerant protocol handling to prevent improper input from causing instability and possible security breach.

In some embodiments, global infrastructure engine 104 provides a high-level mechanism for fault tolerant protocol handling to prevent improper input from causing instability and possible security breach via protocol connector 212 as illustrated by the example depicted in FIG. 9. All codes that process protocol control messages and compressed audio and video streams are isolated in one or more separate, independent, unprivileged processes. More specifically, Separate processes: each incoming connection should cause a new process to be created by protocol connector 212 to handle it. This process should also be responsible for decompressing the incoming media stream, translating the incoming control messages into internal API calls, and decompressing the media into an internal uncompressed representation. For a non-limiting example, inbound H.264 video can be converted into YUV420P frames before being passed on to another process. The goal should be that if this process crashes, no other part of the system will be affected.

Independent processes: each connection should be handled in its own process. A given process should only be responsible for one video conference endpoint so that if this process crashes, only that single endpoint will be affected and everyone else in the system will not notice anything.

Unprivileged processes: each process should be as isolated as possible from the rest of the system. To accomplish this, ideally each process runs with its own user credentials, and may use the chroot( ) system call to make most of the file system inaccessible.

Performance considerations: protocol connector 212 may introduce several processes where typically only one exists brings about the possibility of performance degradation, especially in a system handling audio and video streams where a large amount of data needs to be moved between processes. To that end, shared memory facilities can be utilized to reduce the amount of data that needs to be copied.

In some embodiments, global infrastructure engine 104 supports distributed fault-tolerant messaging for an Internet/cloud-based client-server architecture, wherein the distributed fault-tolerant messaging provides one or more of the following features:

Ability to direct unicast, broadcast, multicast and anycast traffic with both reliable and unreliable delivery mechanisms.

Ability to load balance service requests across media processing nodes and context sensitive or free server classes.

Synchronous & asynchronous delivery mechanisms with ability to deliver messages in spite of process crashes.

Priority based and temporal order delivery mechanisms including atomic broadcasts using efficient fan-out techniques.

Ability to implement an efficient fan out using single write and atomic broadcast.

Ability to discard non-real-time queued messages selectively improving real-time responsiveness.

Priority based queuing mechanism with the ability to discard non-real time events not delivered.

A transaction aware messaging system.

Integration with a hierarchical entry naming system based on conference rooms, IP addresses, process names, pids etc.

Traditionally, legacy video endpoints of the video conference participants, such as video conferencing endpoints using the H.323 protocols, typically communicate with other endpoints within a LAN of a corporate or organizational network. There have been attempts made to enable the H.323 endpoints to seamlessly communicate with endpoints outside the corporate network through firewalls—some of which have been standardized in the form of ITU protocol extensions to H.323, namely H.460.17, 18, 19, 23, 24, while others have been advocated by video conferencing equipment vendors to include deploying gateway hardware or software within DMZ of the corporate network. However, none of these attempts have been very successful as evidenced by the fact the inter-organizational calls are still cumbersome and happen only with heavy IT support and involvement.

Figure 10:
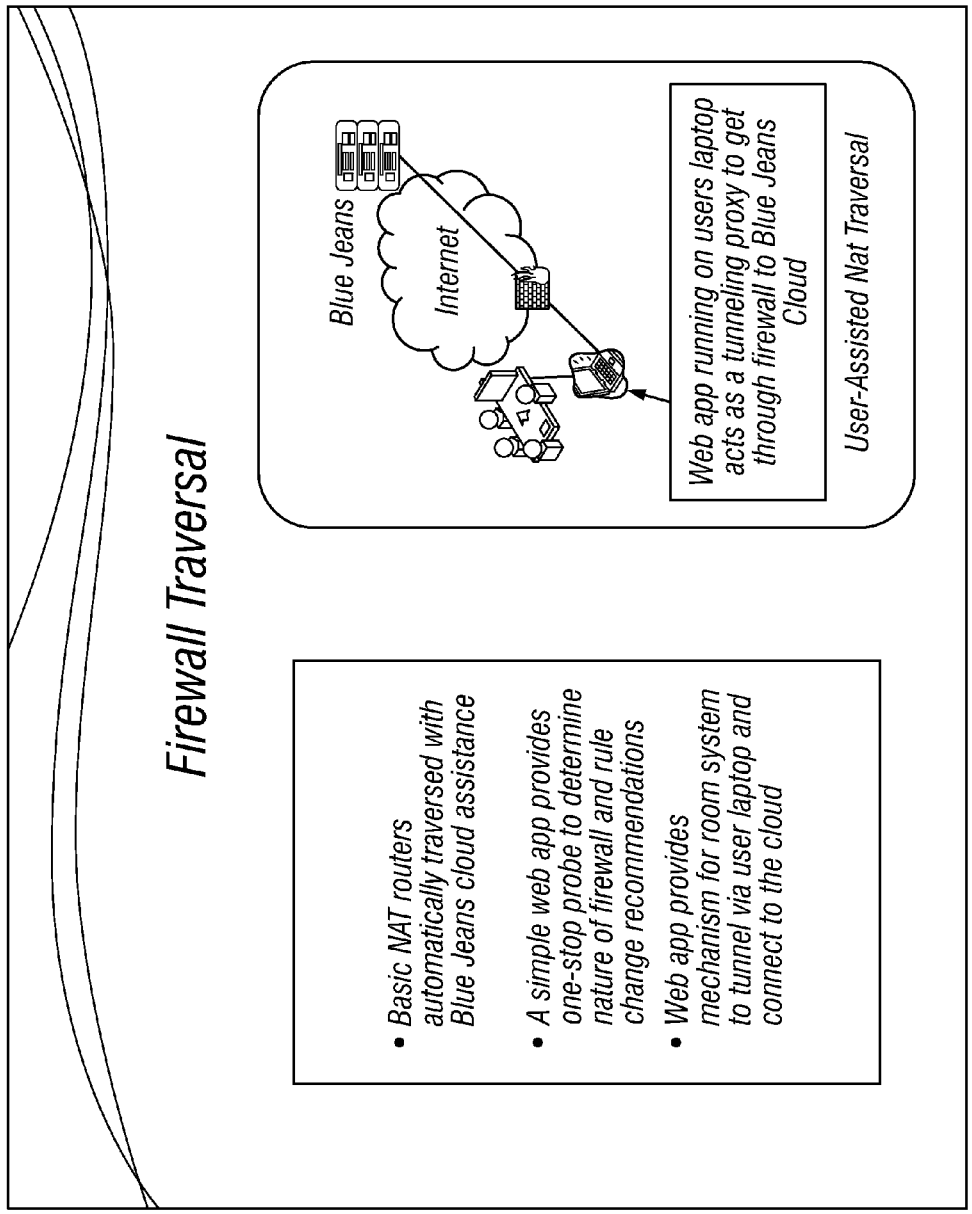
FIG. 10 depicts an example illustrating techniques for firewall traversal.

In some embodiments, global infrastructure engine 104 enables seamless firewall traversal for legacy video conference endpoints of the video conference participants to communicate with other endpoints. Since legacy video conferencing endpoints usually implement only standardized protocols that do not assume an Internet/cloud-based service being available, global infrastructure engine 104 utilizes at least one or more of the following techniques for firewall traversal as illustrated by the example depicted in the diagram of FIG. 10:

Restricting all video conference calls to be outbound calls from the endpoints behind a firewall going to a server in the global infrastructure engine 104 that is reachable on a public IP address on the Internet which is accessible by every user. This avoids the double firewall issue between two corporate or organizational networks that makes inter-organization calls much harder.

Keeping the set of UDP/IP ports used to reach the global infrastructure engine 104 and the set of UDP/IP ports from which global infrastructure engine 104 distributes media to a small named subset of ports. This allows corporations with restricted firewall policies to open their firewalls in a narrow scope versus making the firewall wide open.

Offering a simple web browser-based application that allows any user to easily run a series of checks to ascertain the nature and behavior of a corporation's firewall and to determine whether or not the firewall may be an issue with H.323 endpoints or any rule change would be needed.

Offering an enhanced browser-based application as a tunneling proxy that enables any user to run a software in a browser or native PC OS to allow an endpoint to tunnel through the software to one or more public servers on the Internet. Alternately, the software can be run in a stand-alone manner on any PC or server on the network in native or virtual machine form factor to enable the same tunneling.

In the example of FIG. 1, user experience engine 106 renders multimedia content including but not limited to the composite audio/video stream to each of the participants to the VMR for an enhanced User Experience (UE) for the participants. The UE provided by user experience engine 106 to the participants to the VMR hosted by VMR engine 102 typically comprises one or more of the following areas:

Physical interaction with the video conference endpoint. User experience engine 106 enables controlling the setup and management of a multi-party video conferencing session in a VMR in a device/manufacturer independent way. Most of the physical interaction with the manufacturer supplied remote control can be subsumed by a web application, wherein the web application can be launched from any computing or communication device, including laptop, smart phones or tablet devices. In some embodiments, these interactions could be driven through speech or visual commands as well that the Internet/cloud based software recognizes and translates into actionable events.

User interface (UI) associated with a Web application that controls the participants' interactions with the VMR engine 102. Here, user experience engine 106 controls interaction of the moderator and the conferencing participants. Through an intuitive UI provided by user experience engine 106, participants to the video conference can control such features such as video layouts, muting participants, sending chat messages, share screens and add third party video content.

Video/Multimedia content. User experience engine 106 controls content rendered in the form of screen layouts, composite feeds, welcome banners, etc. during the video conference as well as what the participants see when they log into a VMR, what they physically see on the screen etc. In some embodiments, the UI and/or the multimedia content could contain information related to performance metrics for the participant's call experience, including but not limited to video resolution, video and audio bitrate, connection quality, packet loss rates for the connection, carbon offsets gained as a result of the call, transportation dollars saved and dollars saved in comparison to traditional MCU-based calls. This also allows for eco-friendly initiatives such as infrequent flyer miles or a similarly framed service for miles of travel saved and the bragging rights associated with various status levels similar to frequent flyer status levels. Incentive programs can be based out of attaining different levels of status that encourages participants to use videoconferencing vs. traveling for a meeting. This gives them personal incentive to use videoconferencing over and above the business benefits.

Customization of the video conference session for a specific (e.g., vertical industry) application. User experience engine 106 allows customization of the VMR in order to tailor a video conference session to the needs of a particular industry so that the conference participants may experience a new level of collaboration and meeting effectiveness. Such vertical industries or specialties include but are not limited to, hiring and recruiting, distance learning, telemedicine, secure legal depositions, shared-viewing of real-time events such as sports and concerts and customer support.

Personalization of the VMR as per the moderator's and/or the participants' preferences and privileges. User experience engine 106 provides the moderator the ability to personalize the meeting when scheduling a video conference. Examples of such customization include but are not limited to, the initial welcome banner, uploading of meeting agenda, specifying the video layouts that will be used in the session and privileges given to the session participants.

Despite the fact that most conventional video conference systems cost tens of thousands of dollars, they offer very limited freedom and flexibility to the call organizer or to any participants in terms of controlling the user experience during the call. The layouts come pre-configured to a select few options, and the settings that can be modified during a call are also limited.

In some embodiments, user experience engine 106 provides moderator-initiated in-meeting/session management and control over security and privacy settings during a particular video conference call, wherein such management and control features include but are not limited to, muting a particular speaker at the video conference, controlling and/or broadcasting layouts associated with one of the video conference endpoints to all or a subset of the participants, and sharing additional materials selectively with a subset of the participants (for a non-limiting example, in an HR vertical application where multiple interviewers are interviewing one candidate in a common call).

By offering the video conferencing service over the Internet/cloud, user experience engine 106 eliminates a lot of these limitations of the conventional video conference systems. For a non-limiting example, user experience engine 106 enables participants associated different types of video conference endpoints to talk to each other over the Internet during the video conference. For a non-limiting example, participants from H.323 endpoints to talk to participants from desktop clients such as Skype, and both the moderator and the participants can choose from a wide variety of options. In addition, by providing the ability to terminate the service in the cloud, user experience engine 106 enables access to a much richer set of features for a conference call that a participant can use compared to a conventional passively bridged conference call. More specifically, every participant can have control of one or more of:

1. Which active participants to the VMR to view in his/her video windows on the screen of his/her video conference endpoint.

2. Layout options for how the different participants should be shown on the screen of his/her video conference endpoint.
3. Layout options on where and how to view the secondary video channel (screen sharing, presentation sharing, shared viewing of other content) on the screen of his/her video conference endpoint.

Using such in-meeting controls, a moderator can control security and privacy settings for the particular call in ways that prior art does not allow, or does not provide for.

Figure 11:
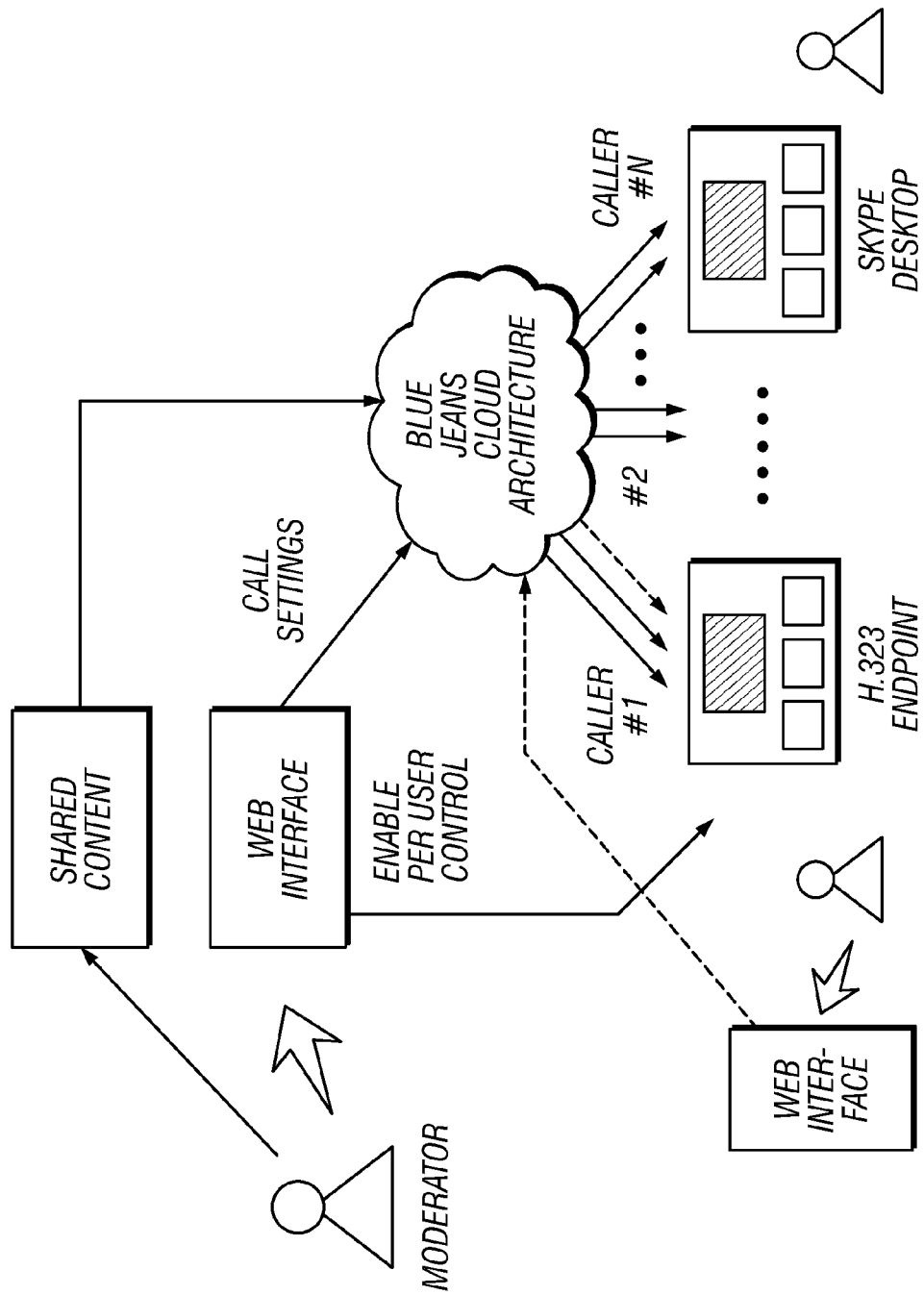
FIG. 11 depicts an example of a diagram to manage and control the video conference.

As shown in the example depicted in the diagram of FIG. 11, the moderator of the call, in addition to the aforementioned options, has a richer suite of options to pick from through a web interface to manage and control the video conference, which include but are not limited to,
1. Muting subsets of participants during a call.
2. Sharing content with subsets of participants during the course of a call.
3. Prescribing a standard layout of the screen of his/her video conference point and a set of displayed callers for other participants to see.
4. Choosing to display caller-specific metadata on the respective video windows of a subset of the participants, including user-name, site name, and any other metadata.
5. Easy and seamless way to add or remove participants from the video conference call through a real-time, dynamic web interface.
6. Easily customizable welcome screen displayed to video callers on joining the call that can display information relevant to the call as well as any audio or video materials that the service provider or the call moderators wishes for the participants to see.

In some embodiments, user experience engine 106 enables private conferences in a VMR by creating sub-rooms in main VMR that any subset of the participants to the main VMR could join and have private chats. For a non-limiting example, participants can invite others for a quick audio/video or text conversation while being on hold in the main VMR.

A shared experience of events among participants to a video conference often requires all participants to be physically present at the same place. Otherwise, when it happens over the Internet, the quality is often very poor and the steps needed to achieve this are quite challenging for the average person to pursue this as a viable technological option.

In some embodiments, user experience engine 106 provides collaborative viewing of events through VMRs that can be booked and shared among the participants so that they are able to experience the joy of simultaneously participating in an event and sharing the experience together via a video conference. For a non-limiting example, the shared event can be a Super Bowl game that people want to enjoy with friends, or a quick session to watch a few movie trailers together among a group of friends to decide which one to go watch in the theater.

Figure 12:
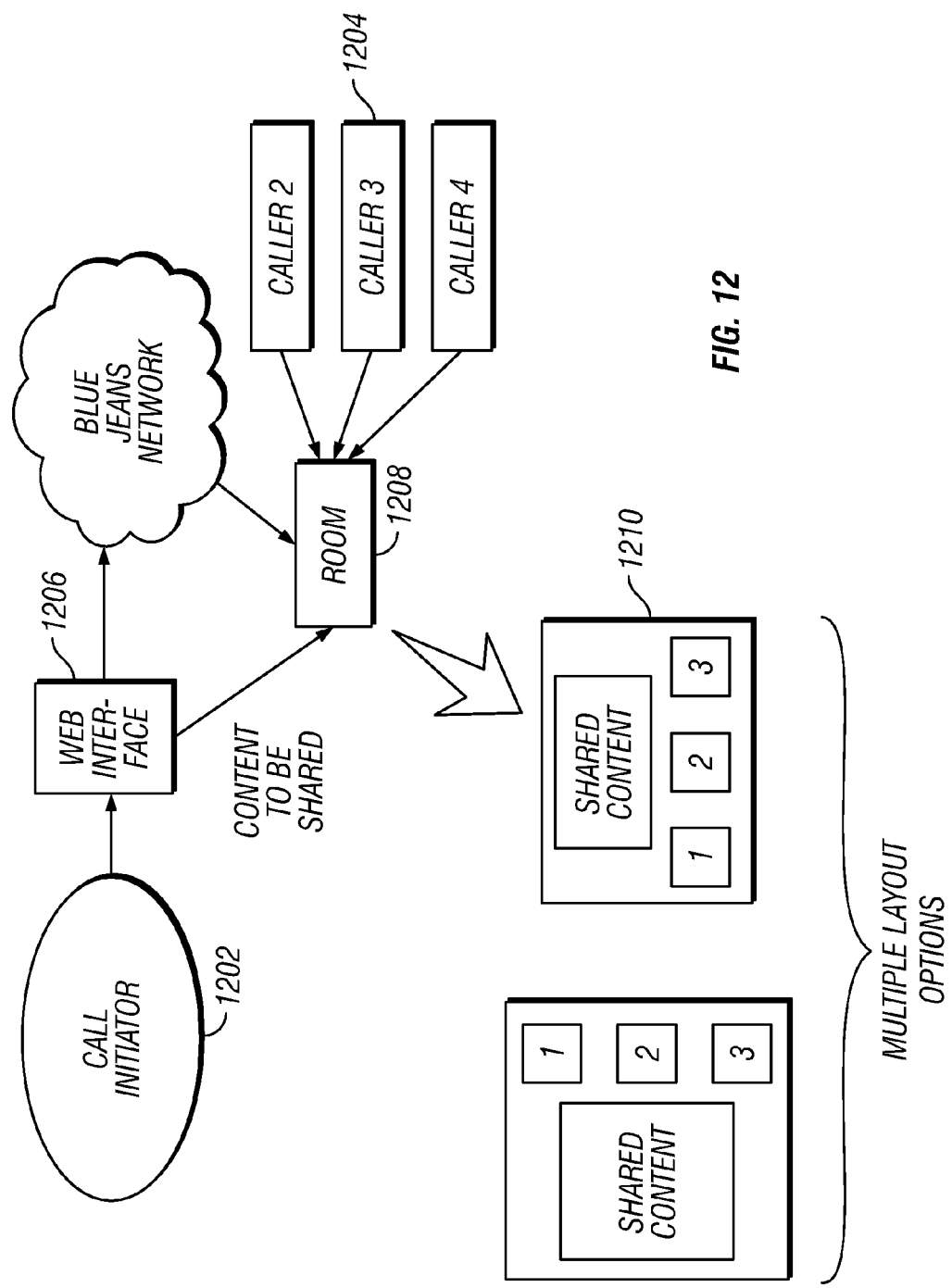
FIG. 12 depicts an example of a diagram for high-quality event sharing using MCUs of the global infrastructure engine.

In some embodiments, user experience engine 106 utilizes the MCUs of the global infrastructure engine 104 to offer an easy, quick, and high-quality solution for event sharing as illustrated by the example depicted in the diagram of FIG. 12. More specifically, user experience engine 106 enables one initiating participant 1202 to invite a group of other participants 1204 for a shared video conference call in a VMR 1208 via a web interface 1206. Once everyone joins in VMR 1206 to share online videos and content, initiating participant 1202 can then present the link to the website where the content to be shared 1208 is located and the content 1208 starts streaming into the same VMR 1206 directly from the content source whether the content is co-located with the initiating participant 1202 or located on the Internet on a $3^{rd}$ party web site or content store. Participant 1202 may continue to have conversations with other participants 904 while watching this content 1210. features that include but are not limited to, the layout of the content in terms of where it is visible, its audio level, whether it should be muted or not, whether it should be paused or removed temporarily are in the control of the person sharing the content 1210 similar to the management and control by a moderator to a video conference as discussed above. Such an approach provides a compelling and novel way to watch live events among groups of people whose locations are geographically distributed, yet want to experience an event together. This enables a whole new set of applications around active remote participation in live professional events such as conferences and social events such as weddings.

In some embodiments, user experience engine 106 enables multiple views and device-independent control by the participants to the video conference. Here, the video endpoints each have its own user interface and in the case of hardware video systems available in conference rooms, the video conference endpoints may each have a remote control that is not very easy to use. In order to make the user experience of connecting to the VMR simple, user experience engine 106 minimizes the operations that need to carry out using the endpoints native interface and move all of those functions to a set of interfaces running on a device familiar to most users—desktop PC, laptop PC, mobile phone or mobile tablet, and thus makes the user experience to control the VMR mostly independent of the endpoint devices user interface capabilities. With such device-independent control of the video conference, user experience engine 106 provides flexibility, ease-of-use, richness of experience and feature-expansion that it allows to make the experience far more personal and meaningful to participants.

In some embodiments, user experience engine 106 may also allow a participant to participate in and/or control a video conference using multiple devices/video conference endpoints simultaneously. On one device such as the video conference room system, the participant can receive audio and video streams. On another device such as a laptop or tablet, the same participant can send/receive presentation materials, chat messages, etc. and also use it to control the conference such as muting one or more of the participants, changing the layout on the screens of the video conference endpoints with PIP for the presentation, etc. The actions on the laptop are reflected on the video conference room system since both are connect to the same VMR hosting the video conference.

Joining a video conference from H323 endpoints today often involve cumbersome steps to be followed via a remote-control for the device. In addition to logistical issues such as locating the remote in the required room, there are learning-curve related issues in terms of picking the correct number to call from the directory, entering a specified code for the call from the remote etc. Both endpoint participants as well as desktop participants are directly placed into conference with their video devices turned on upon joining a call.

Figure 14:
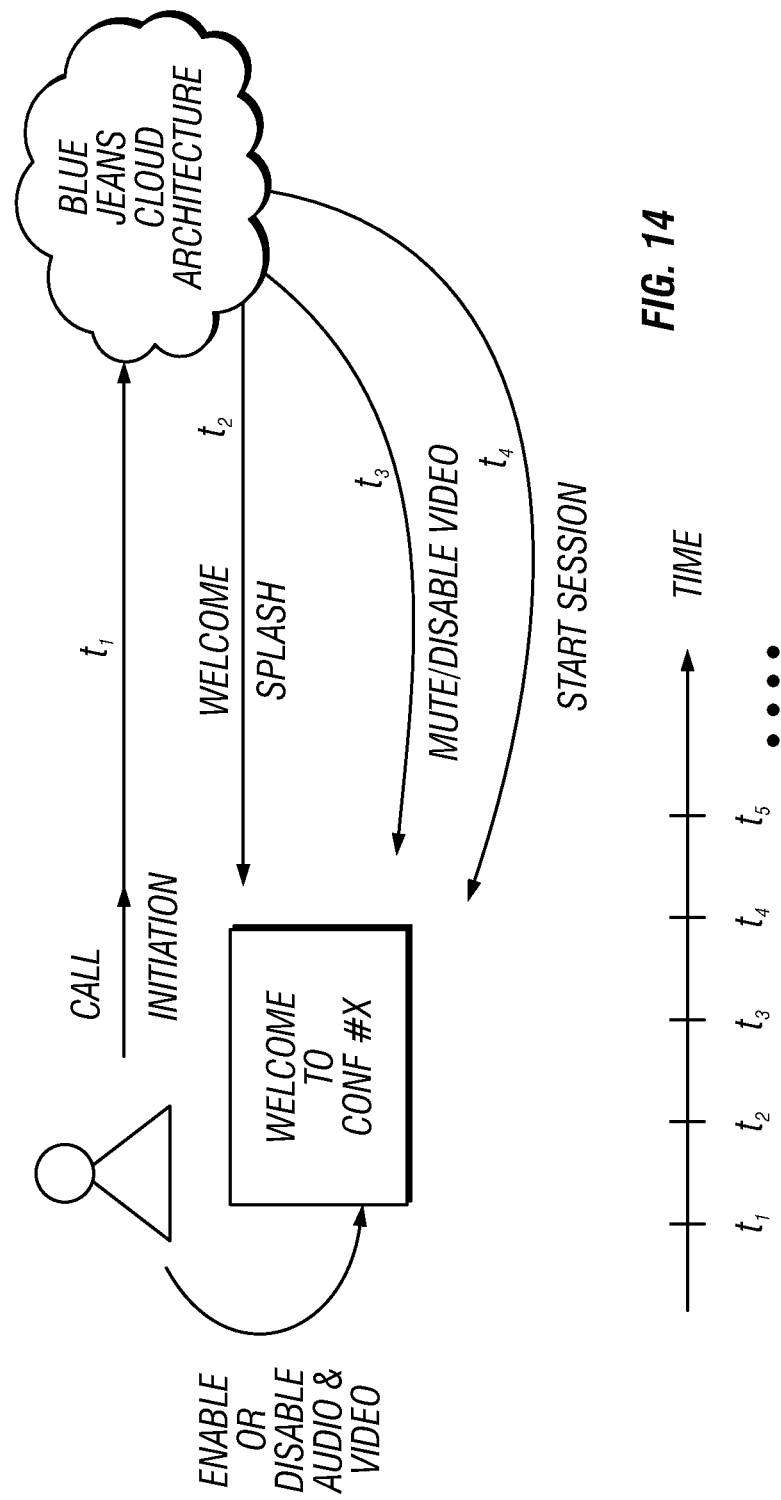
FIG. 14 depicts an example of a diagram for providing welcome screen content to the participants.

In some embodiments, user experience engine 106 offers radically new ways to improve and simplify this user experience by rendering to the participants welcome screen content that includes but is not limited to, interactive welcome handshake, splash screen, interactions for entering room number related info, welcome video, etc. for video conferences as shown in the example depicted in the diagram of FIG. 14. To join a call from a video conference endpoint, all that the moderator needs to do is to call a personal VMR number he/she subscribes to. The moderator can then setup details for the call, including the rich media content that would form part of the welcome handshake with other participants, which may then be setup as default options for all calls hosted by the moderator. Other participants call into the VMR and enter the room number specified for the conference call. On joining the VMR, they first enjoy the rich media content setup as their welcome screen, including content specific to the call, such as agenda, names of parties calling in, company related statistics etc. Such content could also be more generic for non-business applications, including any flash content include videos, music, animations, ads etc. Upon joining the call, the display also shows a code that is specific to the participant on his/her screen, which can be applied to content to the call for content sharing. The code can also be entered from a web application used for the call or can be driven through voice or visual commands that are recognized and processed by software in the internet cloud that are then translated into actionable events.

Figure 13:
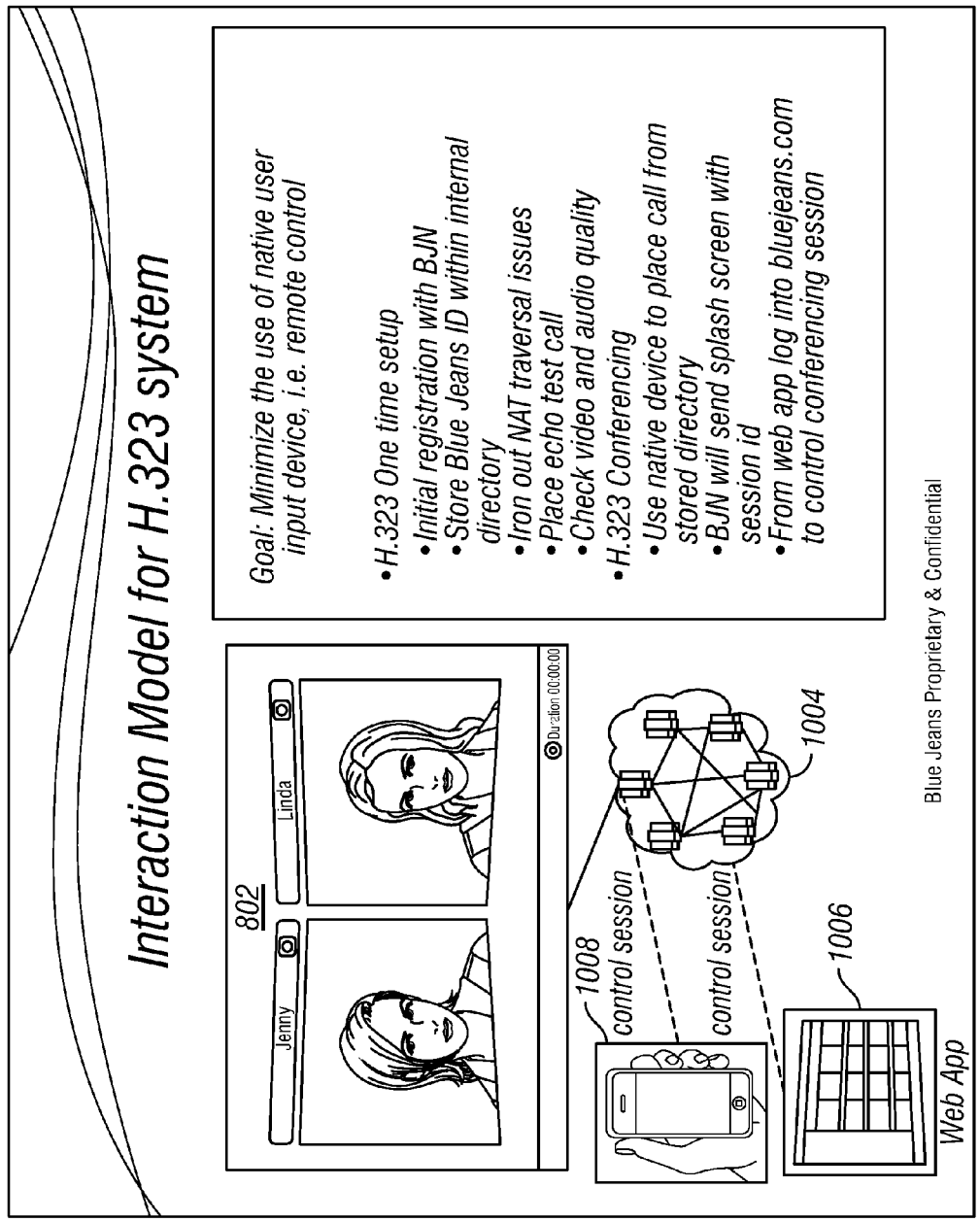
FIG. 13 depicts an example of one way in which a laptop or mobile phone could be associated with a conference room system.

FIG. 13 depicts an example of one way in which a laptop or mobile phone could be associated with a conference room system, wherein the participant uses an H/W room conferencing system 1002 and dials out to a well-known VMR 1004 using the directory entry on the remote. Once connected, user experience engine 106 plays back a welcome screen, along with a "session id" associate with this leg of the conference. The participant goes to a web application 1006 or mobile application 1008 and enters this session id into the application along with the meeting number of the VMR that he/she wishes to join, which places the participant into the VMR. Alternatively, a participant can join in a video conference hosted in a VMR via one of the following ways:

- Using touch tone on the conference room system
- Controlling via voice recognition once dials in
- Playing recognizable music or sound patterns from the laptop into the conference room system
- Showing some gestures or patterns to the camera of the conference room once it is connected.

The experience as described above also provides the opportunity to not have audio or video streams turn on by default for any of the participants. When all participants are settled in and the call is ready to start, the moderator could enable this globally, and each participant may have fine-grained control over whether to turn on/off their audio/video as well. In some embodiments, this also allows for monetizable services to be provided while participants wait, such as streaming advertisements that are localized to the participants region, timezone, demographics and other characteristics as determined by the service in the internet cloud. In other embodiments, while people wait for the call to begin, videos about new features introduced in the service could be shown, while in some other embodiments, detailed information about participants on the call could be shown in multimedia-rich formats that were not possible in prior-art.

Currently, consumers who wish to organize a video call, have only two sets of options available—either choose a business/professional option that uses H323 endpoints such as Polycom or Tandberg system, or use limited functionality/ quality desktop applications that show them postage-stamp quality video of participants, typically on a simple or bland background or interface.

Figure 15:
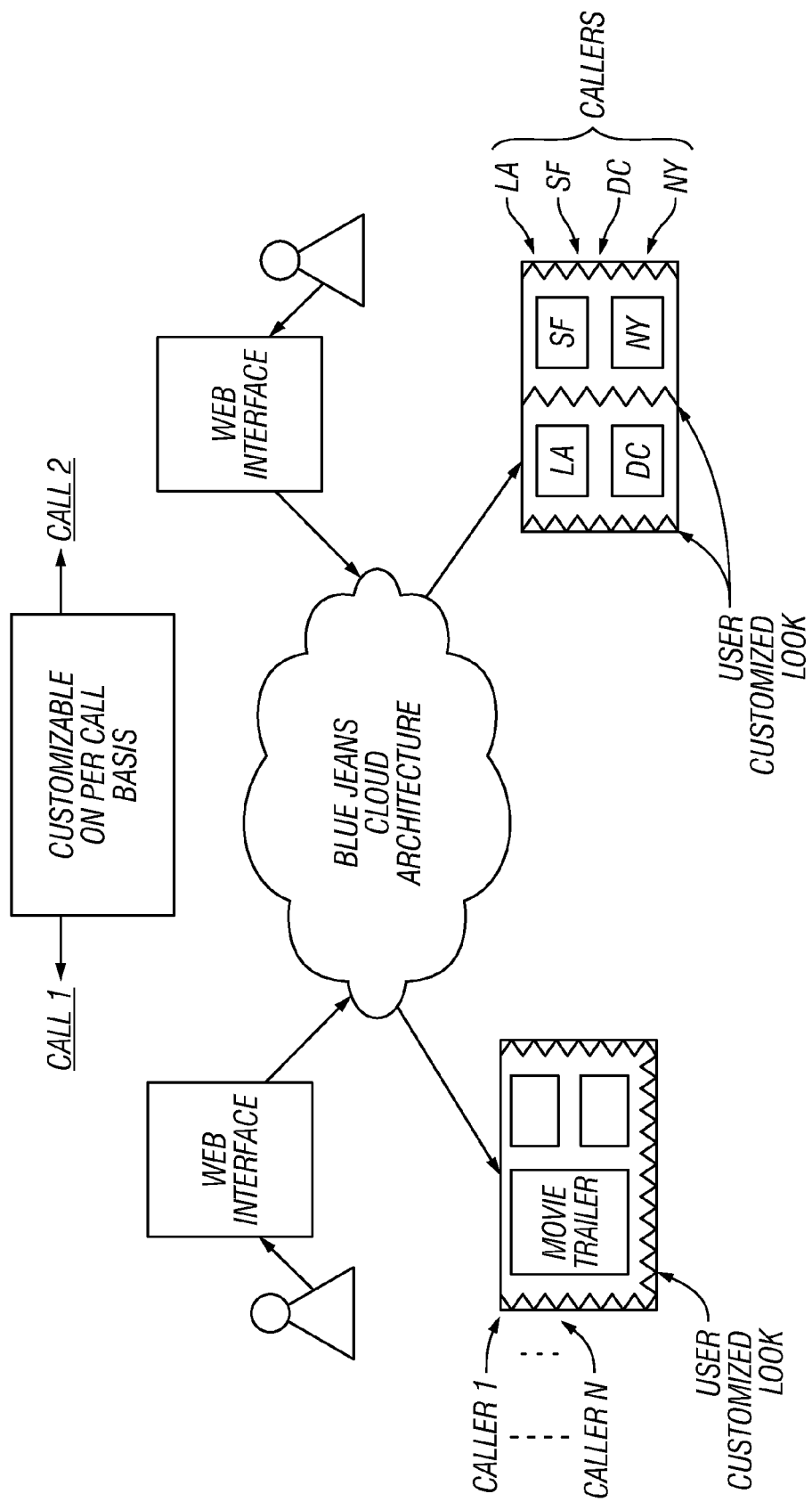
FIG. 15 depicts an example of a diagram for personalizable videoconference rooms on a per call basis.

To address this situation, user experience engine 106 provides personalizable VMRs to allow participants to customize or personalize his/her conference experience on a per call basis as depicted by the example of the diagram of FIG. 15, which dramatically transforms, revolutionizes, and democratizes the video conference experience. For business users, user experience engine 106 provides the layout and background for the call resembling a conference room, or a similar professional setting, and different types of backgrounds, welcome music, welcome banner and other status and chat messages and tickers during the call.

The moderator for the call can pick this from a suite of options provided to him/her based on the subscription plan. For retail consumers, the experience would be a lot more informal and transformative. The caller could decorate his/ her room in any way he/she prefers. The participant's personal website for the VMR could be similarly decorated and customized. During the course of the call, user experience engine 106 may extract or read in these customizable options specified by the different participants and place them in this customized VMR so that the experience is much more enriched than a conventional call.

Offering such personalized conference service over the Internet/cloud has the distinct advantage of removing processor and computing capabilities at any of the endpoint equipment. As long as the endpoints are able to receive and process encoded video streams, user experience engine 106 are able to provide any level of media-rich content to the participants as part of their call experience, all of which can be controlled and setup by the moderator of the VMR.

For a two-person conversation, instead of a traditional flat layout showing both parties side by side, user experience engine 106 may present a 3D layout where the input videos from both participants are set to make it look like that they are looking at each other so that other participants at the video conference see the conversation happen more naturally. Similarly, for a non-traditional application such as remote medicine or a conference call where patients can talk to doctors remotely, the conference itself could be made to resemble a doctor's office. Patients could watch a video together about some health related issue while they wait for the doctor, and once the doctor calls in, the experience could simulate a virtual doctor's office visit. Other applications include but are not limited to scenarios such as recruiting could have their own customized layout and look-and-feel of a video call with the resume of interviewee being visible to the interviewers in their video, and can be edited and annotated by the interviewers, but this may be hidden from the interviewee.

A "meet-me" service such as ours preserves anonymity of callers by allowing them to call in from any software or hardware endpoint without the callee finding any personal identifiable information about the caller.

A significant pain point for Web users currently is a lack of convenient and complete solutions to collaborate remotely. There are many scenarios in which users need to share what is currently on their screen—a drawing, a video, the current state of their machine during online troubleshooting, to name a few—with a remote user. The only way to do this currently is to be signed in to a desktop client that supports screen sharing, ask a contact for permission to start sharing. If one does not have such a desktop client, or the person they wish to share a screen with is not a contact on that client, this method fails. Moreover, these solutions aren't available on mobile phone and other small screen devices.

Figure 16:
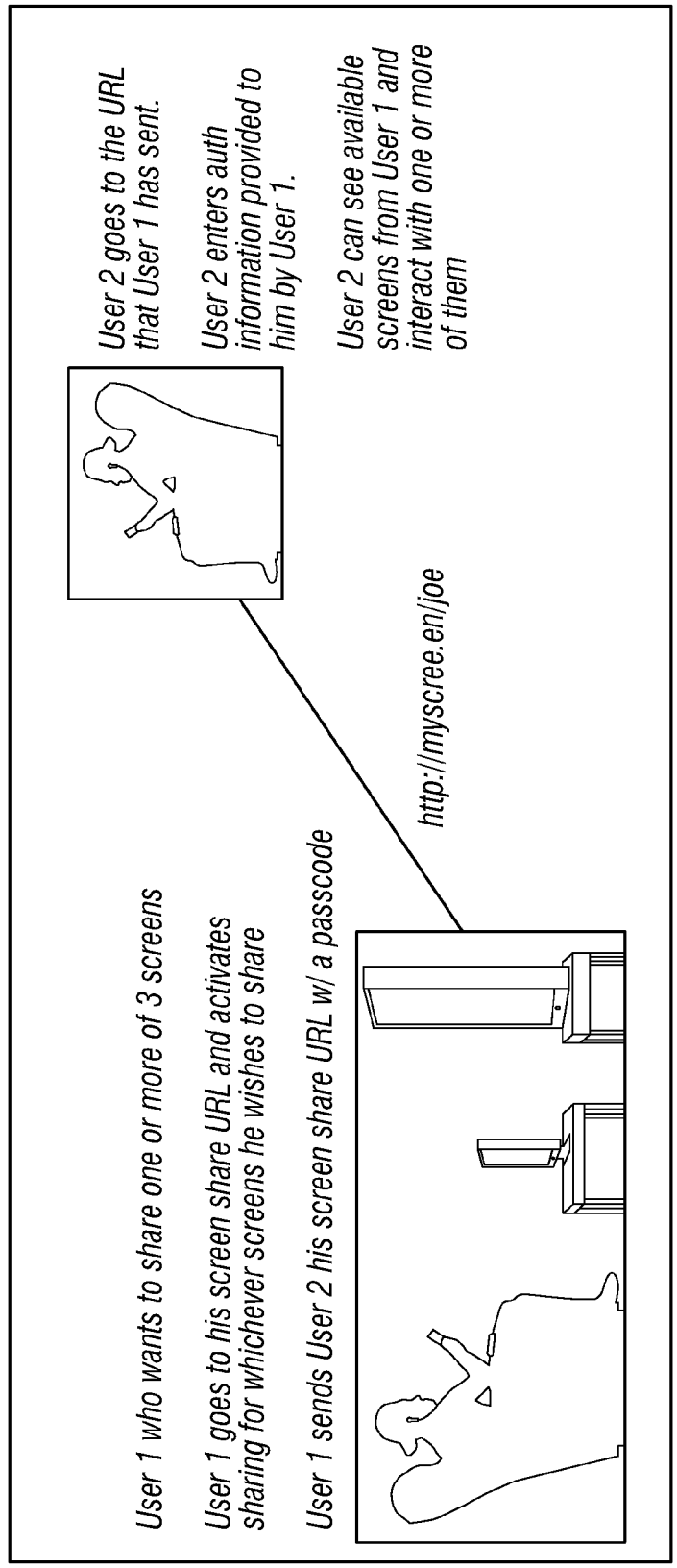
FIG. 16 depicts an example of a single online "home" for personalized sharing one's desktop, laptop and/or mobile screen.

In some embodiments, user experience engine 106 creates a single online "home" for personalized sharing one's desktop, laptop and/or mobile screen with other video conference endpoints. As discussed herein, screen sharing refers to the act of being able to see a remote machine's screen by displaying one's own screen to the screen of another/remote video conference endpoints, or both in a streaming fashion. Some minor variants of this include allowing the remote user to see only parts of one's screen, giving them the additional ability to interact with one's screen etc. For non-limiting examples, user experience engine 106 provides one or more of the following features for screen sharing:

Addressable in a personalized, consistent way over HTTP or HTTPS. For a non-limiting example as shown in FIG. 16, a user of the service would be allotted a URL of the form http://myscre.en/joeblow to serve as a persistent access link to the user's screen, whenever the user is sharing one or more of his/her screens. The user can then share this URL with his/her friends, colleagues, on their online profiles on social networks etc. Here, the URL can be a so-called TinyURL, which is a shortened URL (typically <10 characters, including domain ending) that can serve as an easy shorthand for a location on the web.

Access to one's screen sharing URL will be customizable with a default option to only be available when the user is actively choosing to share his/her screen. Moreover, a combination of participant passcodes, timed screen share sessions and IP address filtering options are provided to the user to ensure maximum control over the people the user shares his/her screens with.

While in the screen share mode, participants will be shown the list of available screens and can choose to view one or more of these. Depending on the host's permission settings, they may also be given remote access to interact with the screen being shared.

Companies such as Skype have created browser plug-ins that allow a participant to easily call any number that is displayed in his/her browser with one click by showing a "Skype phone" logo next to any number displayed in the browser and routing these calls through a Skype desktop client. On the other hand, users today commonly have their online contacts in one of a few stores—Google contacts, Exchange, Yahoo contacts, Skype, Facebook etc. While these contacts can be interacted in different ways from within native applications (for a non-limiting example, hovering over a Google contact gives users a menu with options to mail or IM that contact), there is no simple pervasive way to offer one-click video call functionality across different contact protocols similar to what Skype does for numbers.

In some embodiments, user experience engine 106 supports web browser and/or desktop plug-ins to enable intelligent one-click video conference calls to participants (as opposed to numbers) on VMR contacts from recognized protocols of the video conference points. As used herein, plug-in refers to a small piece of software that extends the capabilities of a larger program, which is commonly used in web browsers and desktop applications to extend their functionality in a particular area.

Figure 17:
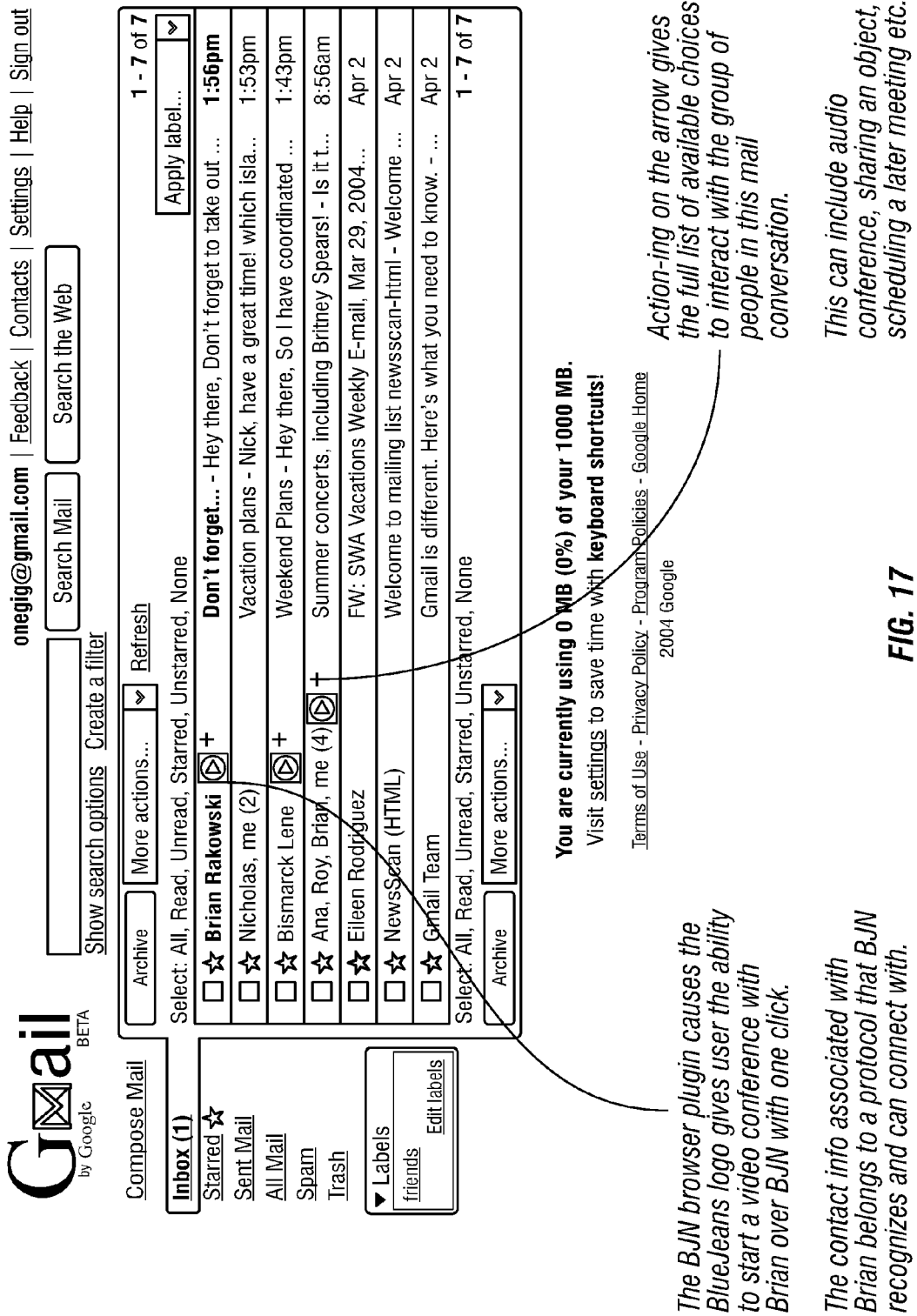
FIG. 17 depicts an example of one-click video conference call plug-in via a mailbox.

In some embodiments, user experience engine 106 creates plug-ins that offer such functionality wherever contacts from recognized protocols are displayed in the browser (ex. Gmail, Y! Mail, etc.) and/or desktop applications (MS Outlook, Thunderbird etc.). As shown in the example of FIG. 17, the one-click video conference call plug-in offered by user experience engine 106 has at least the following features:

1. A user has to agree to install the plug-in(s) and the applications in which they will be active.
2. For enabled applications, every contact from a recognized protocol (tentatively, Exchange and Google contacts) has a "video call" logo next to it. For a non-limiting example, if the sender of a mail in a user's Exchange mailbox was on a recognized protocol, the display interface of the mailbox is enhanced with a video call logo and a small arrow to show more options.
3. Clicking on the logo launches a video conference call via a VMR between the user and that contact, with an appropriate choice of endpoints for either end.
4. Clicking on the arrow provides users with the complete list of ways in which they can interact with this contact via the VMR service, including audio calls, scheduling a future call, etc.

In some embodiments, user experience engine 106 performs automatic video gain control when some rooms of the video conference call are too bright and cause distraction. Similar to AGC (Auto Gain Control) in audio systems, the brightness of all rooms of the video endpoints that are part of the video conference can be adjusted to give a semblance that the conference is happening in the same place. Optionally, automatic video gain control can be turned on by a participant to the conference who feels that the brightness of one or more of the rooms are disturbing.

In some embodiments, user experience engine 106 provides live information about cost saving of the ongoing video conference, such as miles saved, cost of gas and hotel per call, achieved by the video conference. Here, the distance between participants can be calculated based on geo-location of IP addresses and mileage and federal mileage credits can be calculated based on the miles saved per call in order to come up with a total dollar amount to be rendered on the screen. The carbon offsets that can be claimed can also be computed based on the locations of participants and duration of the call, and displayed to the participants appropriately.

Virtual reality (VR) representations today straddle the spectrum between avatars that are preconfigured to be picked from, to static images that can be uploaded and animated to a limited extent. In a multiparty video call setting, there is no way to either re-locate the participants onto a virtual world while keeping their personas real-world, or transplanting them into a VR world as well as "avatarizing" their personas at the same time.

Figure 18:
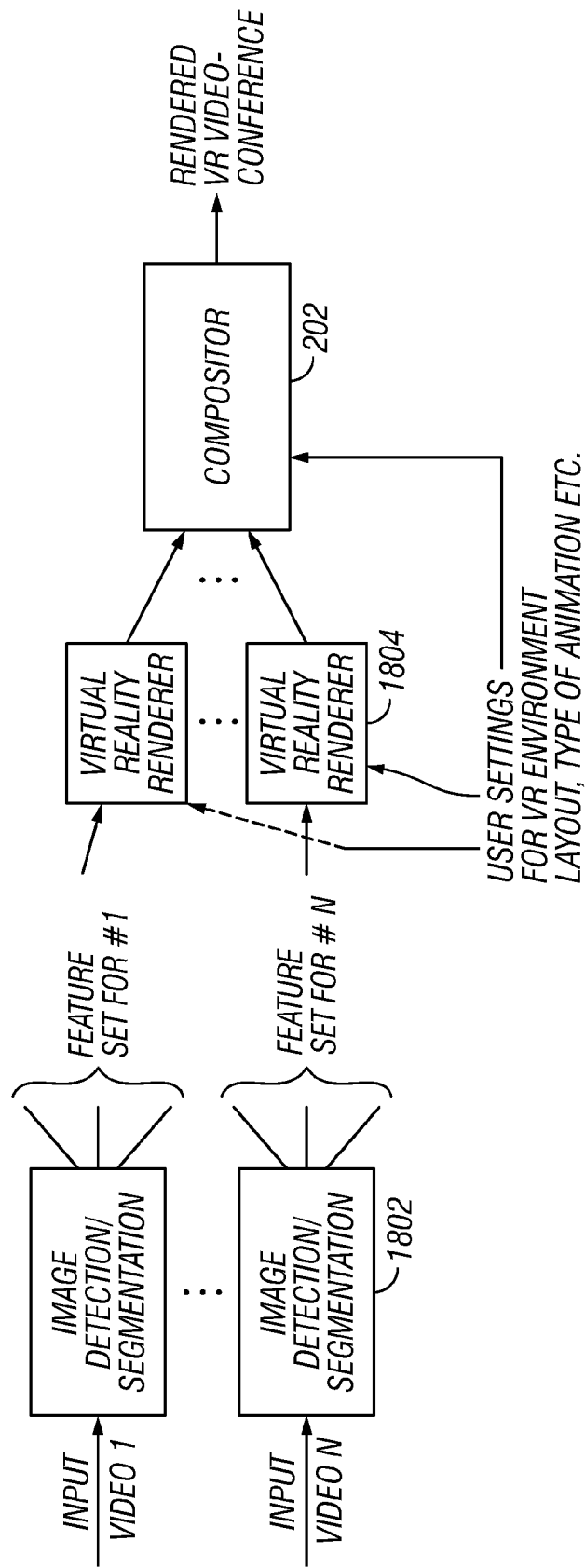
FIG. 18 depicts an example of a diagram for delivering a virtual reality experience to the participants.

In some embodiments, user experience engine 106 presents photo-realistic virtual reality (VR) events to participants to a video conference through the MCUs of the global infrastructure engine 104 to resolve both issues discussed above. Like a conventional video conference call, the VMR takes in the inputs of audio/video streams from the different participants' cameras, composites them together into one, encodes and sends the composite video to each participant separately. When the participants desire a VR version of an event, user experience engine 106 takes one or more of the additional steps as follows to deliver such VR experience to the participants as depicted in the diagram of the example of FIG. 18:

1. Image detection and segmentation component 1802 receives the input video from each participant.
2. Segmentation component 1802 detects and extracts out a participant from background of the video stream and provides metadata about his/her location and other features in the video stream.
3. User experience engine 106 then animates the participant via virtual reality rendering component 1804 by adding various characteristics to the face of the participant, or transforming the face by applying any image transformation algorithm. It may perform further analysis, face and feature detection and fully animate the face of the participant to create a semi-animated version of the face itself.
4. Video compositor 302 within media processing node 300 then replaces the extracted background with the background overlaid with VR rendered (animated) participant and provides the video stream to other participants.

With such an approach, user experience engine 106 is able to capture and transform the input video and audio streams from different participants in different customizable ways to achieve different user experiences.

In some embodiments, user experience engine 106 may extract all participants out of their environments of video streams, and then add them back to a common environment and sent together as one video stream. For a non-limiting example, different participants calling in from different geographical locations can all be made to look like they are seated across each other at a conference table and having a conversation.

Providing localized, real-time offering of ads related to services available to a user in a particular geographical area has immense market application and benefits. The few current solutions that exist rely heavily or purely on GPS related information, or high performance processor on the mobile device to do the processing required to generate the information. In some embodiments, user experience engine 106 enables internet/cloud-based augmented-reality user interaction services via the MCUs of the global infrastructure engine 104. More specifically, user experience engine 106 analyzes the video stream captured from a participant/user's video conference endpoint (e.g., a cell phone camera) and provides augmented-reality video feed back to the user with annotations on services available in the geographical area of the participant, such as local events, entertainment and dining options. All the user needs to do is to place a video call to a VMR, while directing his/her camera towards the objects of his/her interest. As shown in the example depicted in the diagram of FIG. 19, user experience engine 106 and global infrastructure engine 104 takes away any requirement for processor capability at the user's device to process the received video in the cloud, analyze it via image detection and segmentation component 1902 for, for non-limiting examples, billboards, identifiable landmarks in order to check against the GPS information from location service database 1904 or obtained from the user's GPS information to determine his/her whereabouts. User experience engine 106 then modifies the input video feed using the gathered geological information of the user and overlays the video stream via metadata compositor 1906 with metadata such as names of restaurants within walking distance, names of entertainment options locally to generate an augmented reality feed for the user.

Figure 19:
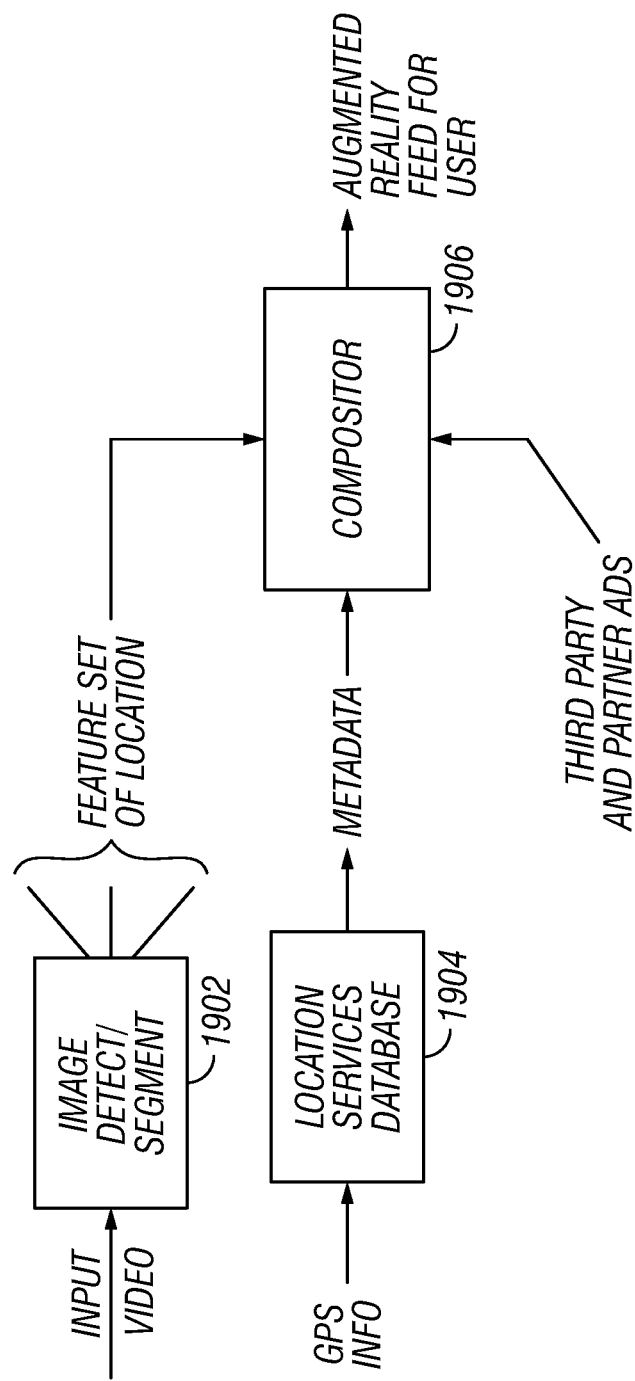
FIG. 19 depicts an example of a diagram for augmented-reality user interaction services to the participants.

In the example of FIG. 19, image detection and segmentation component 1302 is at the core of this logic, which analyzes the input video and extracts zones of interest within the video. Location service database 1904 is populated with information about different zip-codes which can take in GPS data and/or zipcodes as input and provide a rich set of data about the services in that area and any other offerings that would be of interest. Metadata compositor 1906 renders metadata in real time that will take the inputs from image detection and segmentation component 1902 and location service database 1904 and overlay the input video feed with useful metadata about the surroundings as discussed above.

In some embodiments, user experience engine 106 may provide a guided tour of the area as the user walks around the area, where user experience engine 106 may pre-fill the screen with more information about the sights and sounds of the area. In some embodiments, user experience engine 106 may populate that information into the video as well and show pictures of friends who might be nearby in order to tie this augmented reality service into existing services for locating friends within the same neighborhood.

In some embodiments, the augmented reality service provided by user experience engine 106 is customizable, not just at the time of installation of any software downloaded onto a mobile device of the user, but on a per-use basis. The user may use the augmented reality service for various purposes, for non-limiting examples, a 411 lookup at one instant, and immediately after that, the user may call in and get a virtual tour of a local tourist highlight. Soon after that, the user may ask for restaurant related information to go grab a meal. As more information becomes available on third party sites about each location, the user experience engine 106 provides a seamless way to tie up with each of those providers over the Internet/cloud to offer more current information to each user. Since such an approach is completely rack-and-stack, depending solely on the plan that a user chooses, the calls can be run through a system with more processing capabilities to extract and provide more information to the user, thus providing a full suite of pricing options depending on the feature set needed by each user.

In some embodiments, user experience engine 106 supports real-time translator-free multimedia communications during a live video conference by translating between different languages in real-time in the cloud, so that participants to the VMR could speak to each other in different languages and still continue on an intelligent conversation. More specifically, the real-time cloud-based translation may include but is limited to one or more of the following options:

Real voice plus subtitles in one common language, e.g., a videoconference where different speakers could be speaking in different languages and the translation/subtitling gets done seamlessly in the cloud;

Translation from speech-to-visual for speech-initiated services such as search and location-based services;

Translated voices in language that each participant can select for him/herself;

Same language as what the speaker is speaking, but choice of different voices to replace the speaker's voice;

Simultaneous delivery of multimedia addresses/sessions in different languages to different users through the cloud;

Applications other than audio/video transmission, such as real-time translation of documents/inputs from the format of the sender to any supported format that any receiver chooses to receive data in. The conversion happens in real-time in the cloud.

Given the latency built into videoconferencing, a service like this would do away with the need to have human translators when two or more parties are communicating in different languages.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more hosts to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human viewer or other mechanism utilizing the results of the present invention. Such software may include, but is not limited to, device drivers, operating systems, execution environments/containers, and applications.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "interface" is used in the embodiments of the systems and methods described above, it will be evident that such concept can be interchangeably used with equivalent software concepts such as, class, method, type, module, component, bean, module, object model, process, thread, and other suitable concepts. While the concept "component" is used in the embodiments of the systems and methods described above, it will be evident that such concept can be interchangeably used with equivalent concepts such as, class, method, type, interface, module, object model, and other suitable concepts. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. A system, comprising:
   a virtual meeting room (VMR) engine, which in operation, accepts from a plurality of participants to a video conference a plurality of audio and video streams from a plurality of video conference endpoints each associated with one of the plurality of participants;
   enables a multi-party video conferencing session in real time among the plurality of participants;
   a user experience engine, which in operation, provides a moderator of the video conference with in-meeting management and control of a plurality of security and privacy settings to render content of the video conference to provide a different user experience for a subset of the plurality of participants during the video conference.

2. The system of claim 1, wherein:
   the user experience engine enables participants associated different types of the video conference endpoints to talk to each other over the Internet during the video conference.

3. The system of claim 2, wherein:
   the user experience engine enables participants associated H.323 conference endpoints to talk to participants associated with desktop endpoints to talk each other over the Internet during the video conference.

4. The system of claim 1, wherein:
   the user experience engine enables each of the plurality of participants to control which active participants to the VMR to view in his/her video windows on the screen of his/her video conference endpoint.

5. The system of claim 1, wherein:
   the user experience engine enables each of the plurality of participants to control layout options on the screen of his/her video conference endpoint.

6. The system of claim 1, wherein:
   the user experience engine enables the moderator to mute a particular speaker at the video conference.

7. The system of claim 1, wherein:
   the user experience engine enables the moderator to control and/or broadcast layouts associated with one of the video conference endpoints to all or a subset of the participants.

8. The system of claim 1, wherein:
   the user experience engine enables the moderator to share additional materials selectively with a subset of the participants.

9. The system of claim 1, wherein:
   the user experience engine enables the moderator to prescribe a standard layout of the screen of his/her video conference point and a set of displayed callers for other participants to see.

10. The system of claim 1, wherein:
    the user experience engine enables the moderator to choose to display caller specific metadata on the respective video windows of a subset of the participants.

11. The system of claim 1, wherein:
    the user experience engine enables the moderator to add or remove participants from the video conference through a real-time, dynamic web interface.

12. The system of claim 1, wherein:
    the user experience engine enables private conferences in the video conference by creating sub-rooms in a main VMR that a subset of the participants to the main VMR can join and have private chats.

13. A method, comprising:
    accepting from a plurality of participants to a video conference a plurality of audio and video streams from a plurality of video conference endpoints each associated with one of the plurality of participants;
    enabling a multi-party video conferencing session in real time among the plurality of participants;
    providing a moderator of the video conference with in-meeting management and control of a plurality of security and privacy settings to render content of the video conference to provide a different user experience for a subset of the plurality of participants during the video conference.

14. The method of claim 13, further comprising:
    enabling participants associated different types of the video conference endpoints to talk to each other over the Internet during the video conference.

15. The method of claim 14, further comprising:
    enabling participants associated H.323 conference endpoints to talk to participants associated with desktop endpoints to talk each other over the Internet during the video conference.

16. The method of claim 13, further comprising:
    enabling each of the plurality of participants to control which active participants to the video conference to view in his/her video windows on the screen of his/her video conference endpoint.

17. The method of claim 13, further comprising:
    enabling each of the plurality of participants to control layout options on the screen of his/her video conference endpoint.

18. The method of claim 13, further comprising:
    enabling the moderator to mute a particular speaker at the video conference.

19. The method of claim 13, further comprising:
    enabling the moderator to control and/or broadcast layouts associated with one of the video conference endpoints to all or a subset of the participants.

20. The method of claim 13, further comprising:
enabling the moderator to share additional materials selectively with a subset of the participants.

21. The method of claim 13, further comprising:
enabling the moderator to prescribe a standard layout of the screen of his/her video conference point and a set of displayed callers for other participants to see.

22. The method of claim 13, further comprising:
enabling the moderator to choose to display caller-specific metadata on the respective video windows of a subset of the participants.

23. The method of claim 13, further comprising:
enabling the moderator to add or remove participants from the video conference through a real-time, dynamic web interface.

24. The method of claim 13, further comprising:
enabling private conferences in the video conference by creating sub-rooms in a main VMR that A subset of the participants to the main VMR can join and have private chats.

* * * * *